(12) United States Patent
Kondoh et al.

(10) Patent No.: US 8,832,930 B2
(45) Date of Patent: Sep. 16, 2014

(54) METHOD OF FABRICATING TOUCHSCREEN PANEL BY SEGMENTING TRANSPARENT CONDUCTOR LAYER

(71) Applicant: Fujitsu Component Limited, Tokyo (JP)

(72) Inventors: Koichi Kondoh, Tokyo (JP); Takashi Nakajima, Tokyo (JP); Nobuyoshi Shimizu, Tokyo (JP); Masanobu Hayama, Tokyo (JP); Norio Endo, Tokyo (JP)

(73) Assignee: Fujitsu Component Limited, Tokyo (JP)

(*) Notice: Subject to any disclaimer, the term of this patent is extended or adjusted under 35 U.S.C. 154(b) by 0 days.

(21) Appl. No.: 14/059,940

(22) Filed: Oct. 22, 2013

(65) Prior Publication Data

US 2014/0041208 A1 Feb. 13, 2014

Related U.S. Application Data

(62) Division of application No. 12/758,077, filed on Apr. 12, 2010, now Pat. No. 8,599,565.

(30) Foreign Application Priority Data

| Apr. 21, 2009 | (JP) | 2009-103353 |
| Apr. 21, 2009 | (JP) | 2009-103354 |
| Apr. 21, 2009 | (JP) | 2009-103355 |
| May 8, 2009 | (JP) | 2009-113694 |

(51) Int. Cl.
*G06F 3/041* (2006.01)
*G06F 3/045* (2006.01)

(52) U.S. Cl.
CPC .................................. *G06F 3/045* (2013.01)
USPC .................. 29/830; 29/831; 29/846; 345/173; 361/748; 361/790; 174/260

(58) Field of Classification Search
USPC ............ 29/846, 831; 345/173; 361/748, 680, 361/683, 66, 790, 743; 174/260; 200/302.1, 200/512
See application file for complete search history.

(56) References Cited

U.S. PATENT DOCUMENTS

| 4,731,508 A | * | 3/1988 | Gibson et al. | 178/18.05 |
| 4,797,514 A | * | 1/1989 | Talmage et al. | 178/18.05 |

(Continued)

FOREIGN PATENT DOCUMENTS

| CN | 1942853 | 4/2007 |
| CN | 101286107 | 10/2008 |

(Continued)

OTHER PUBLICATIONS

Partial European Search Report dated Aug. 11, 2010.

(Continued)

*Primary Examiner* — Peter DungBa Vo
*Assistant Examiner* — Kaying Kue
(74) *Attorney, Agent, or Firm* — IPUSA, PLLC

(57) ABSTRACT

A touchscreen panel includes an upper substrate having a first transparent conductor layer provided on a first base layer, and a lower substrate having a second transparent conductor layer provided on a second base layer. The first and second transparent conductor layers oppose each other via a spacer and make contact when the first base layer is pressed. The first transparent conductor layer is segmented into a plurality of conductive regions that are electrically insulated from each other.

4 Claims, 21 Drawing Sheets

(56) References Cited

U.S. PATENT DOCUMENTS

| | | | |
|---|---|---|---|
| 5,402,151 A * | 3/1995 | Duwaer | 345/173 |
| 5,815,141 A * | 9/1998 | Phares | 345/173 |
| 6,163,313 A * | 12/2000 | Aroyan et al. | 345/173 |
| 6,304,251 B1 * | 10/2001 | Ito et al. | 345/173 |
| 6,522,320 B1 * | 2/2003 | Chou | 345/157 |
| 6,762,124 B2 | 7/2004 | Kian et al. | |
| 6,781,579 B2 * | 8/2004 | Huang et al. | 345/173 |
| 7,561,334 B2 * | 7/2009 | Luo | 359/577 |
| 7,701,631 B2 * | 4/2010 | Floyd et al. | 359/290 |
| 7,710,629 B2 * | 5/2010 | Palmateer | 359/245 |
| 2002/0110944 A1 | 8/2002 | Kian et al. | |
| 2002/0111029 A1 | 8/2002 | Johnson | |
| 2006/0097991 A1 | 5/2006 | Hotelling et al. | |
| 2009/0160819 A1 | 6/2009 | Sasaki et al. | |
| 2010/0225598 A1 | 9/2010 | Shen | |
| 2013/0063358 A1 | 3/2013 | Huang | |

FOREIGN PATENT DOCUMENTS

| | | |
|---|---|---|
| EP | 2045698 A2 | 4/2009 |
| JP | 58-207186 | 12/1983 |
| JP | 03-201120 | 9/1991 |
| JP | 8-278489 | 10/1996 |
| JP | 2002-182854 | 6/2002 |
| JP | 2004-139144 | 5/2004 |
| JP | 2004-272722 | 9/2004 |
| JP | 2006-039667 | 2/2006 |
| JP | 2006-185338 | 7/2006 |
| JP | 2006-277051 | 10/2006 |
| JP | 2007-200177 | 8/2007 |
| JP | 2008-091116 | 4/2008 |
| JP | 2008-293129 | 12/2008 |
| JP | 2009-076432 | 4/2009 |
| TW | 201007544 | 2/2010 |
| WO | WO 2006/028131 | 3/2006 |
| WO | WO2007/146779 A2 | 12/2007 |

OTHER PUBLICATIONS

Extended European Search Report dated Nov. 12, 2010.
Office Action dated May 31, 2011 issued with respect to the corresponding Korean Patent Application No. 10-2010-0035970.
Office Action dated Nov. 24, 2011 issued with respect to the corresponding Chinese Patent Application No. 201010169334.3.

* cited by examiner

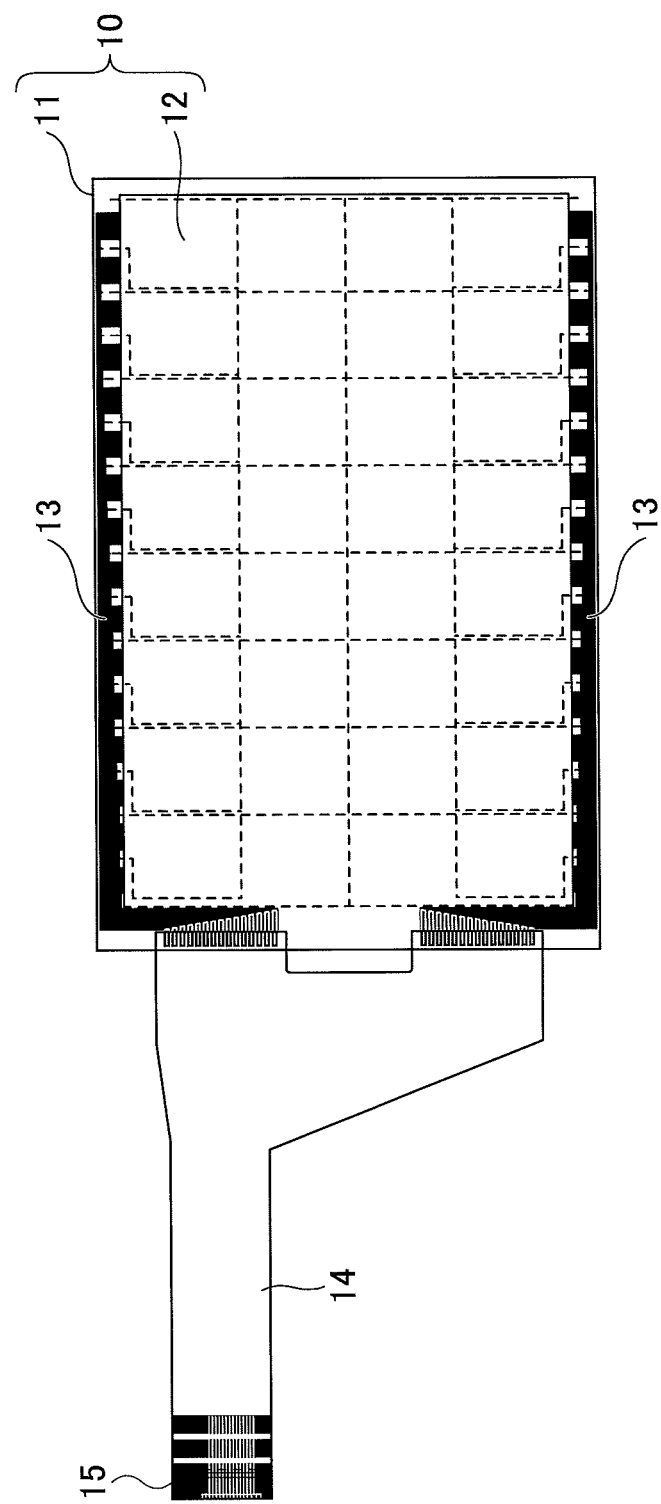

FIG.13

| FREQUENCY OF LASER BEAM | ENERGY OF LASER BEAM | | | | | |
|---|---|---|---|---|---|---|
| | 40 μJ | 50 μJ | 100 μJ | 240 μJ | 300 μJ |
| 20kHz | × | × | × | ○ | ○ |
| 40kHz | × | × | △ | ○ | ○ |
| 50kHz | × | × | ○ | ○ | × |
| 60kHz | △ | △ | ○ | × | × |
| 80kHz | ○ | ○ | ○ | × | × |
| 100kHz | ○ | ○ | × | × | × |

METHOD OF FABRICATING TOUCHSCREEN PANEL BY SEGMENTING TRANSPARENT CONDUCTOR LAYER

CROSS-REFERENCE TO RELATED APPLICATIONS

This application is a divisional application of U.S. patent application Ser. No. 12/758,077 filed on Apr. 12, 2010, which is based upon and claims the benefit of priority of Japanese Patent Applications No. 2009-103355 filed on Apr. 21, 2009, No. 2009-103353 filed on Apr. 21, 2009, No. 2009-103354 filed on Apr. 21, 2009, and No. 2009-113694 filed on May 8, 2009, the entire contents of which are incorporated herein by reference.

BACKGROUND OF THE INVENTION

1. Field of the Invention

The present invention generally relates to touchscreen panels, electronic apparatuses having touchscreen panels, and methods of fabricating touchscreen panels.

2. Description of the Related Art

The touchscreen panel is arranged in front of a display panel, and is used as an input device to detect the presence and location of a touch on a display of the display panel. Because the touchscreen panel enables a user to make a direct input based on information that is displayed on the display panel and is visually detected by the user, the touchscreen panel is popularly used in various applications.

A resistive touchscreen panel is well known. The resistive touchscreen panel has an upper electrode substrate formed with a transparent conductor layer, and a lower electrode substrate formed with a transparent conductor layer, with a gap formed between the opposing transparent conductor layers. When a force is applied at one point on the upper electrode substrate, the opposing transparent conductor layers make contact to enable detection of the position where the force is applied.

The resistive touchscreen panel may be roughly categorized into the 4-wire type and the 5-wire type. The 4-wire type resistive touchscreen panel has an x-axis electrode provided on one of the upper and lower electrode substrates, and a y-axis electrode provided on the other of the upper and lower electrode substrates. On the other hand, the 5-wire type resistive touchscreen panel has both the x-axis electrode and the y-axis electrode provided on the lower electrode substrate, and the upper electrode substrate functions as a probe for detecting a voltage.

The applicants are aware of Japanese Laid-Open Patent Publications No. 2004-272722 and No. 2008-293129.

Next, a description will be given of the 5-wire resistive touchscreen panel, by referring to FIGS. 1 and 2. FIG. 1 is a perspective view illustrating an example of the 5-wire resistive touchscreen panel, and FIG. 2 is a cross sectional view illustrating the 5-wire resistive touchscreen panel of FIG. 1.

As illustrated in FIGS. 1 and 2, a 5-wire resistive touchscreen panel 200 has a film 210 forming an upper electrode substrate, a transparent conductor layer 230 formed on one surface of the film 210, a glass 220 forming a lower electrode substrate, a transparent conductor layer 240 formed on one surface of the glass 220, and a spacer 250 sandwiched between the two mutually opposing transparent conductor layers 230 and 240. The 5-wire resistive touchscreen panel 200 may be electrically connected to a host computer (not illustrated) via a cable 260.

FIGS. 3A and 3B respectively are a perspective view and a circuit diagram for explaining a coordinate detection in the 5-wire resistive touchscreen panel 200. A voltage is alternately applied in the x-axis direction and in the y-axis direction via electrodes 241, 242, 243 and 244 that are provided at end portions of the four sides of the transparent conductor layer 240 as illustrated in FIG. 3A. When the transparent conductor layers 230 and 240 make contact at a contact position A that is pressed by a finger tip F of the user, for example, a potential Va is detected via the transparent conductor layer 230 as illustrated in FIG. 3B, in order to detect coordinate positions in the x-axis direction and the y-axis direction. In FIG. 3B, Rw denotes a wiring resistance, and IN denotes an input area of the transparent conductor layer 240.

However, the 5-wire resistive touchscreen panel 200 can only detect a single contact position at one time. If multiple contact positions are pressed simultaneously by the finger tips F of the user, for example, the 5-wire resistive touchscreen panel 200 cannot detect the multiple contact positions that are pressed simultaneously.

FIGS. 4A and 4B respectively are a perspective view and a circuit diagram for explaining the coordinate detection in the 5-wire resistive touchscreen panel when multiple contact positions occur simultaneously. In FIGS. 4A and 4B, those parts that are the same as those corresponding parts in FIGS. 3A and 3B are designated by the same reference numerals, and a description thereof will be omitted.

A voltage is alternately applied in the x-axis direction and in the y-axis direction via the electrodes 241, 242, 243 and 244 that are provided at end portions of the four sides of the transparent conductor layer 240 as illustrated in FIG. 4A. When the transparent conductor layers 230 and 240 make contact at contact positions A and B that are pressed simultaneously by the finger tips F of the user, for example, a potential Vc is detected via the transparent conductor layer 230 as illustrated in FIG. 4B, in order to detect coordinate positions in the x-axis direction and the y-axis direction. In this case, an intermediate position between the contact positions A and B is detected from the potential Vc, even though the two contact positions A and B are pressed and the intermediate position is not pressed. In other words, the intermediate position between the contact positions A and B is erroneously detected when the two contact positions A and B are pressed simultaneously.

SUMMARY OF THE INVENTION

Accordingly, it is a general object of the present invention to provide a novel and useful touchscreen panel, electronic apparatus, and method of fabricating a touchscreen panel, in which the problems described above are suppressed.

Another and more specific object of the present invention is to provide a touchscreen panel, an electronic apparatus, and a method of fabricating the touchscreen panel, which enable detection of multiple contact positions that are pressed simultaneously, and if necessary also enable detection of a contact position that moves.

According to one aspect of the present invention, there is provided a touchscreen panel comprising an upper substrate having a first transparent conductor layer provided on a first base layer; a lower substrate having a second transparent conductor layer provided on a second base layer; a spacer interposed between the first and second transparent conductor layers so that the first and second transparent conductor layers oppose each other and make contact when the first base layer is pressed, wherein the first transparent conductor layer is segmented into an array of M rows by N columns of conductive regions that are electrically insulated from each other, where M and N are natural numbers greater than or equal to 2.

According to one aspect of the present invention, there is provided an electronic apparatus comprising a touchscreen panel comprising an upper substrate having a first transparent conductor layer provided on a first base layer; a lower substrate having a second transparent conductor layer provided on a second base layer; a spacer interposed between the first and second transparent conductor layers so that the first and second transparent conductor layers oppose each other and make contact when the first base layer is pressed, wherein the first transparent conductor layer is segmented into an array of M rows by N columns of conductive regions that are electrically insulated from each other, where M and N are natural numbers greater than or equal to 2; and a driving circuit configured to time-divisionally scan the conductive regions of the first transparent conductor layer and detect a contact between the first and second transparent conductor layers at one or multiple contact positions that occur simultaneously.

According to one aspect of the present invention, there is provide a method of fabricating a touchscreen panel, comprising forming an upper substrate having a first transparent conductor layer provided on a first base layer; forming a lower substrate having a second transparent conductor layer provided on a second base layer; segmenting the first transparent conductor layer into an array of M rows by N columns of conductive regions that are electrically insulated from each other, where M and N are natural numbers greater than or equal to 2; and bonding the first and second transparent conductor layers with a spacer interposed therebetween so that the first and second transparent conductor layers oppose each other and make contact when the first base layer is pressed, wherein said segmenting the first transparent conductor layer is performed before said bonding the first and second transparent conductor layers.

Other objects and further features of the present invention will be apparent from the following detailed description when read in conjunction with the accompanying drawings.

BRIEF DESCRIPTION OF THE DRAWINGS

FIG. 5 is a plan view illustrating an upper electrode substrate of a touchscreen panel in a first embodiment of the present invention;

FIG. 13 is a diagram illustrating relationships of frequency and energy of a laser beam that is irradiated and a quality of the upper electrode substrate;

DESCRIPTION OF THE PREFERRED EMBODIMENTS

First Embodiment

A description will be given of a touchscreen panel in a first embodiment of the present invention, by referring to FIGS. 5 through 8.

Figure 1:
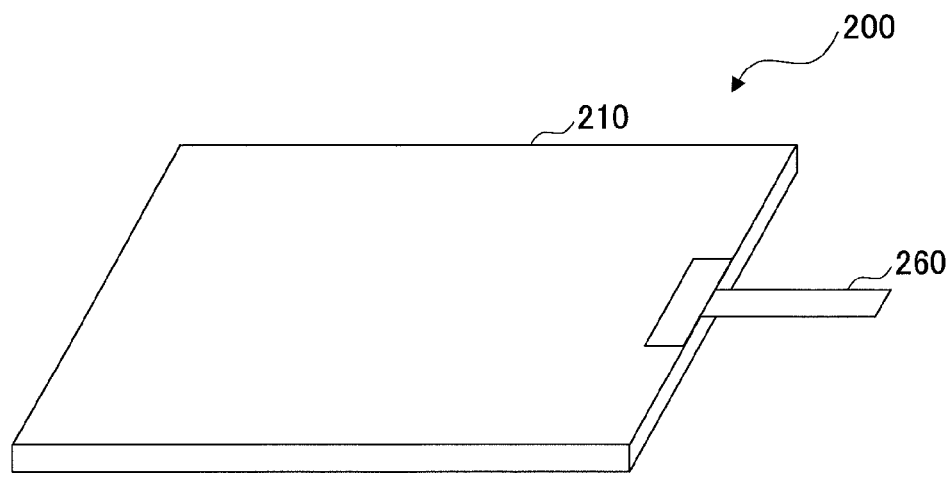
FIG. 1 is a perspective view illustrating an example of a 5-wire resistive touchscreen panel.
Figure 2:
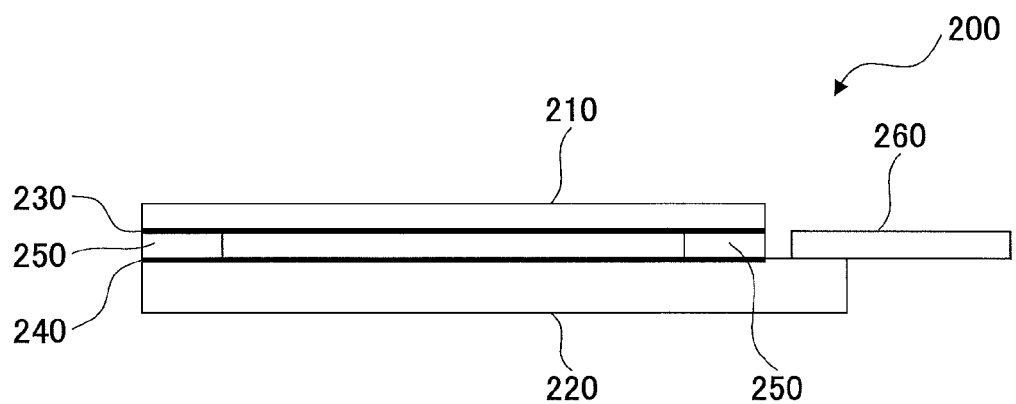
FIG. 2 is a cross sectional view illustrating the 5-wire resistive touchscreen panel of FIG. 1.
Figure 3A:
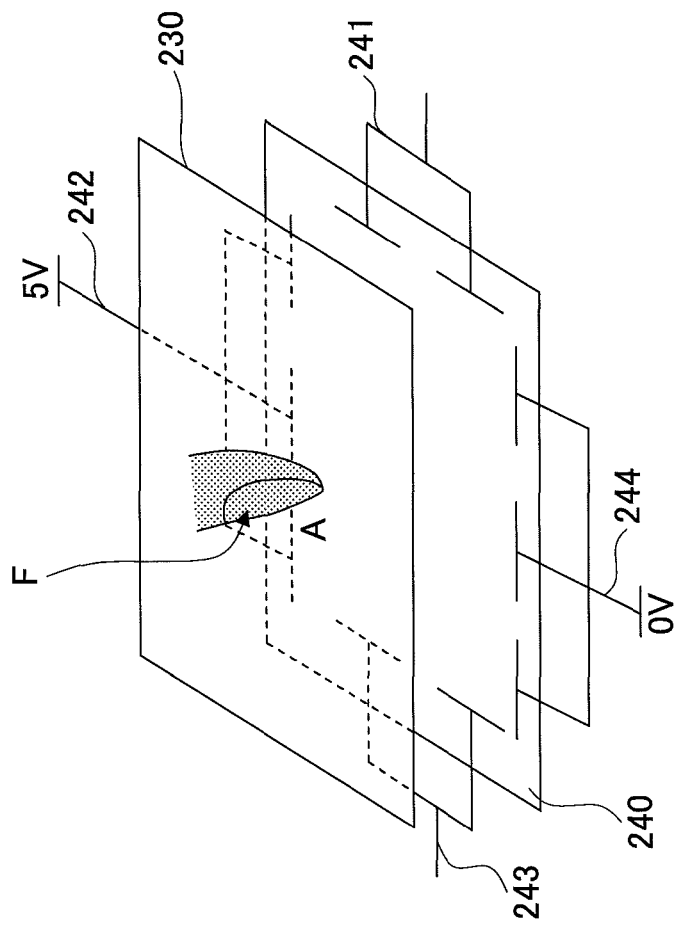
FIGS. 3A and 3B respectively are a perspective view and a circuit diagram for explaining a coordinate detection in the 5-wire resistive touchscreen panel.
Figure 3B:
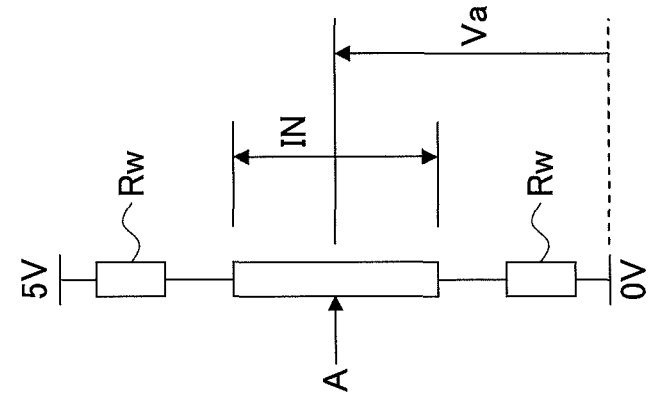
Figure 4A:
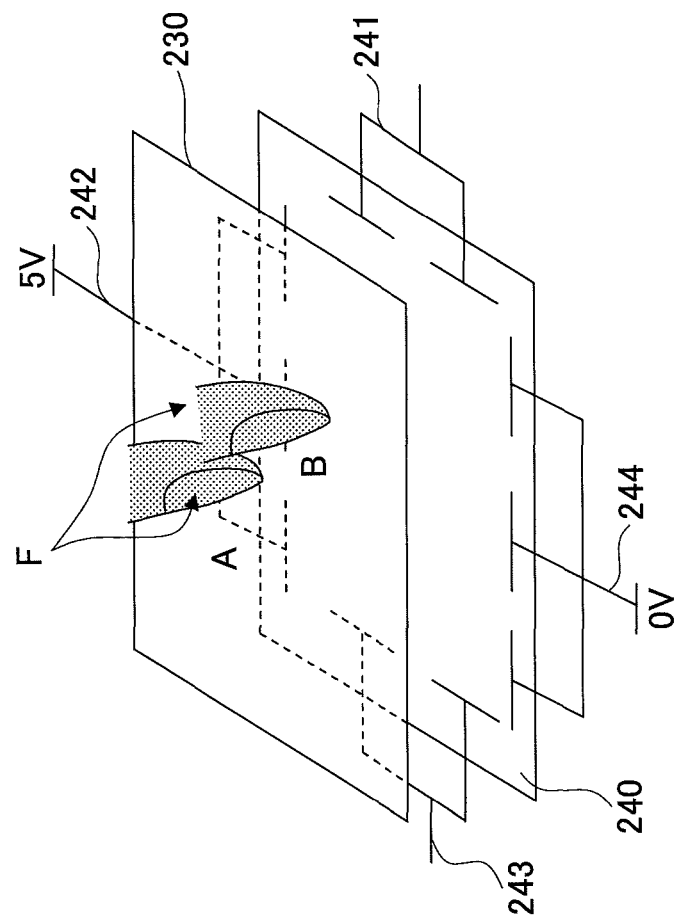
FIGS. 4A and 4B respectively are a perspective view and a circuit diagram for explaining the coordinate detection in the 5-wire resistive touchscreen panel when multiple contact positions occur simultaneously.
Figure 4B:
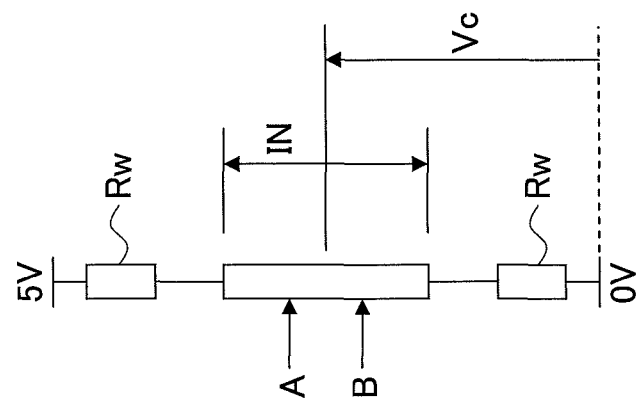
Figure 6:
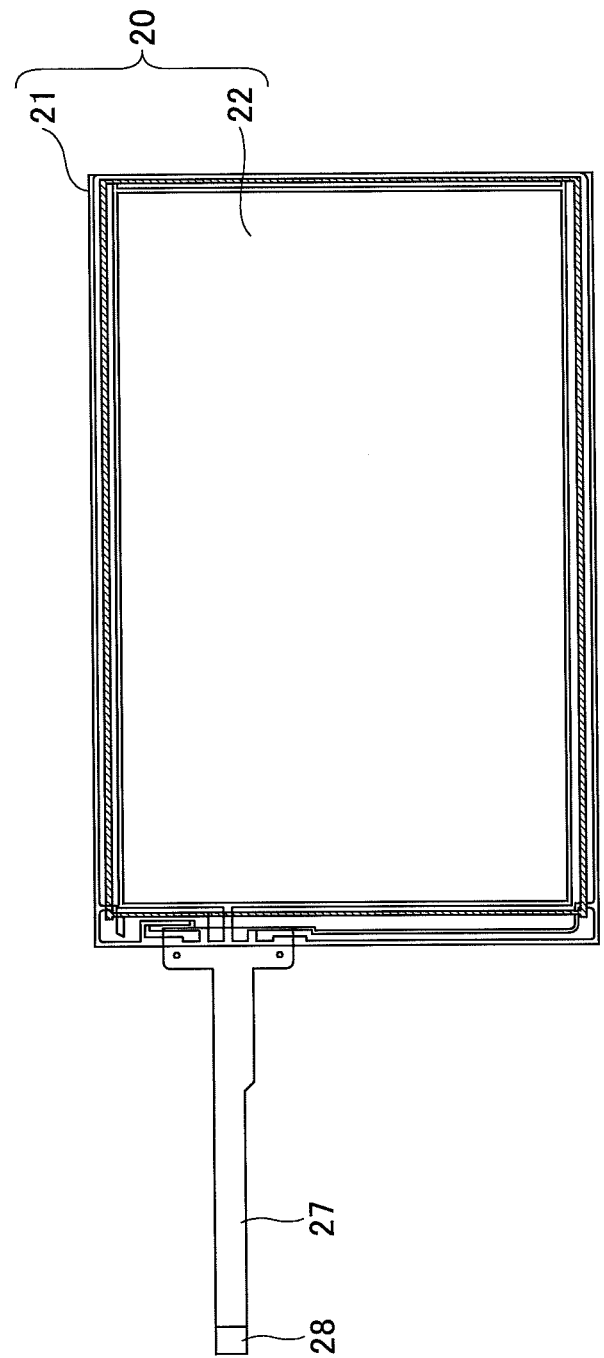
FIG. 6 is a bottom view illustrating a lower electrode substrate of the touchscreen panel in the first embodiment.
Figure 7:
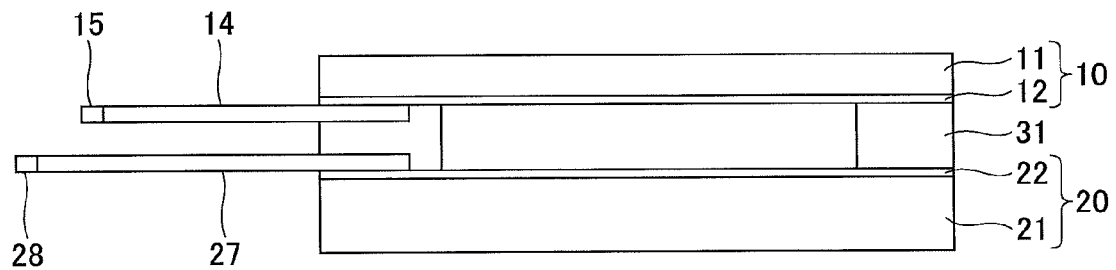
FIG. 7 is a cross sectional view illustrating the touchscreen panel in the first embodiment.

FIG. 5 is a plan view illustrating an upper electrode substrate of the touchscreen panel in the first embodiment of the present invention, and FIG. 6 is a bottom view illustrating a lower electrode substrate of the touchscreen panel in the first embodiment. FIG. 7 is a cross sectional view illustrating the touchscreen panel in the first embodiment, and FIG. 8 is a perspective view for explaining the touchscreen panel in the first embodiment.

The touchscreen panel in this embodiment includes an upper electrode substrate 10 and a lower electrode substrate 20. The upper electrode substrate 10 has a film (or first base layer) 11 and a transparent conductor layer 12 formed on one surface of the film 11, as illustrated in FIGS. 5 and 7. On the other hand, the lower electrode substrate 20 has a substrate (or second base layer) 21 and a transparent conductor layer 22 formed on one surface of the substrate 21, as illustrated in FIGS. 6 and 7. The upper electrode substrate 10 has an approximately rectangular shape, and the substrate 21 has the same shape as or, approximately the same shape as the upper electrode substrate 10. The upper and lower electrode substrates 10 and 20 oppose each other via the transparent conductor layers 12 and 22. More particularly, the transparent conductor layers 12 and 22 oppose each other via a spacer 31 or the like, as illustrated in FIG. 7. The transparent conductor layers 12 and 22 may be bonded to the spacer 31 by an adhesive agent or an adhesive tape, for example.

Figure 8:
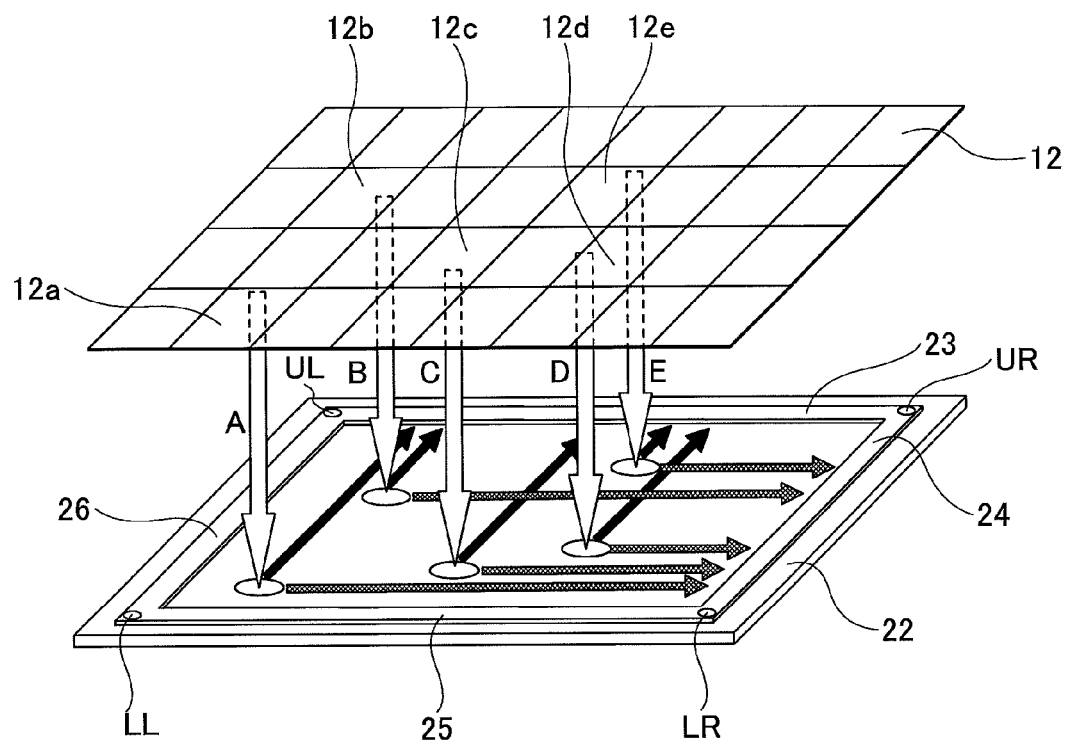
FIG. 8 is a perspective view for explaining the touchscreen panel in the first embodiment.

The transparent conductor layer 12 of the upper electrode substrate 10 is segmented into 32 conductive regions, as illustrated in FIGS. 5 and 8. In this example, the transparent conductor layer 12 is segmented into 4 approximately rectangular conductive regions along a shorter side thereof (or vertical direction in FIG. 5), and is segmented into 8 approximately rectangular conductive regions along a longer side thereof (or horizontal direction in FIG. 5). The transparent conductor layer 12 is segmented into the 32 conductive regions, so that each conductive region is electrically insulated from an adjacent conductive region. For example, the transparent conductor layer 12 may be segmented into 32 conductive regions by removing the transparent conductor layer 12 between two mutually adjacent conductive regions, so that a gap is formed between the two mutually adjacent conductive regions and the two mutually adjacent conductive regions are electrically insulated from each other. Each conductive region of the transparent conductor layer 12 is connected to a corresponding pair of leader electrodes of a pair of electrode parts 13 that are provided along opposite longer sides (or upper and lower ends) of the upper electrode substrate 10. The electrode parts 13 arranged on the periphery of the upper electrode substrate 10 connect to a Flexible Printed Circuit (FPC) 14 at one of the shorter sides (or left end) of the upper electrode substrate 10. The FPC 14 has terminals 15 to be connected to a control circuit or a driving circuit (not illustrated).

Of course, the number of conductive regions on the transparent conductor layer 12 is not limited to 32. The transparent conductor layer 12 may be segmented into M conductive regions along a shorter side thereof (or vertical direction in FIG. 5), and may be segmented into N conductive regions along a longer side thereof (or horizontal direction in FIG. 5), where M and N are natural numbers greater than or equal to 2, and M may be equal to or different from N. The larger the values for M and N, the higher the resolution with which the contact positions are detected. In other words, the transparent conductor layer 12 may be segmented into an array (or a matrix arrangement) of M×N (or M rows by N columns of) conductive regions. In addition, the vertical and horizontal resolutions with which the contact positions are detected may be set differently by suitably setting the values for M and N in relation to the vertical and horizontal lengths (that is, the size or area) of the transparent conductor layer 12.

As illustrated in FIG. 8, 4 electrode portions 23, 24, 25 and 26 that form a rectangular frame (or ring) shaped electrode are provided on the transparent conductor layer 22 along the four sides of the lower electrode substrate 20. The rectangular frame shaped electrode formed by the electrode portions 23, 24, 25 and 26 has electrode parts UL, UR, LL and LR respectively provided at the upper left corner, the upper right corner, the lower left corner, and the lower right corner of the rectangular frame shape. The 4 electrode parts UL, UR, LL and LR are drawn out to the periphery of the lower electrode substrate 20 by leader lines, and connect to a Flexible Printed Circuit (FPC) 27 at one of the shorter sides (or left end) of the lower electrode substrate 20, as illustrated in FIG. 6. The FPC 27 has terminals 28 to be connected to the control circuit or the driving circuit.

The FPCs 14 and 17 are connected to the control circuit or the driving circuit via the terminals 15 and 28 and are further connected to a host computer (not illustrated).

For example, the film 11 may be made of a material such as PET (Poly-Ethylene Terephthalate), PC (Poly-Carbonate), and resin materials that are transparent in a visible region. In addition, the transparent conductor layers 12 and 22 may be made of a material such as ITO (Indium Tin Oxide) or ZnO (zinc oxide) that is added with Al (aluminum) or Ga (gallium) or, $SnO_2$ (tin oxide) added with Sb (antimony). Further, the substrate 21 may be made of glass or materials other than glass, such as resins.

Of course, each of the film 11 and the substrate 21 may be substantially rigid or, may be sufficiently flexible (or resilient) to suit the usage of the touchscreen panel or, the manner in which the touchscreen panel is used, as long as the transparent conductor layers 12 and 22 make contact at a position where a force is applied on the film 11 by a finger of the user or a pen or stylus manipulated by the user. Preferably, at least one of the film 11 and the substrate 21 (in this example, the film 11) is sufficiently flexible to enable the transparent conductor layers 12 and 22 to make contact at the position where the force is applied on the film 11. If both the film and the substrate 21 are flexible, the touchscreen panel may be provided along a curved surface. In this case, the flexibility of the film 11 and the flexibility of the substrate 21 may be the same or may be mutually different.

Preferably, the flexibility of the transparent conductor layer 12 is comparable to that of the film 11 in order to prevent premature separation therebetween, and the flexibility of the transparent conductor layer 22 is comparable to that of the substrate 21 in order to prevent premature separation therebetween.

When the upper electrode substrate 10 is pressed by the finger of the user, for example, the transparent conductor layer 12 of the upper electrode substrate 10 and the transparent conductor layer 22 of the lower electrode substrate make contact at a contact position that is pressed. A potential is detected via the conductive region of the transparent conductor layer 12, in order to detect the contact position. In other words, each of the conductive regions segmenting the transparent conductor layer 12 of the upper electrode substrate 10 is time-divisionally scanned, and it is possible to identify the conductive region that includes the detected contact position at a timing in accordance with the time-divisional scan. A voltage is alternately applied in the x-axis direction and in the y-axis direction, via the electrode parts UL, UR, LL and LR that are provided on the transparent conductor layer 22 at the four corner portions of the lower electrode substrate 20.

Because the contact position is identified for each of the conductive regions segmenting the transparent conductor layer 12 of the upper electrode substrate 10, it is possible to detect multiple contact positions that occur simultaneously. In other words, even when the transparent conductor layer 12 of the upper electrode substrate 10 and the transparent conductor layer 22 of the lower electrode substrate make contact at multiple contact positions that are pressed simultaneously, it is possible to independently detect each of the multiple contact positions.

FIG. 8 illustrates a case where the transparent conductor layer 12 of the upper electrode substrate 10 and the transparent conductor layer 22 of the lower electrode substrate make contact at 5 contact positions A, B, C, D and E that are pressed simultaneously. In this case, the 5 contact positions A, B, C, D and E are respectively located in mutually different conductive regions 12a, 12b, 12c, 12d and 12e on the transparent conductor layer 12, and the 5 contact positions A, B, C, D and E can be detected independently because the conductive regions 12a, 12b, 12c, 12d and 12e are insulated from each other. Hence, it may be seen that two or more contact positions that occur simultaneously can be detected as long as the two or more contact positions are located in mutually different conductive regions on the transparent conductor layer 12, because the mutually different conductive regions are insulated from each other.

Therefore, it is possible to detect multiple contact positions that occur simultaneously, by time-divisionally scanning the plurality of conductive regions on the transparent conductor layer 12 and detecting the potential via the plurality of conductive regions. In addition, it is possible to accurately detect the coordinate positions of the multiple contact positions that occur simultaneously, by detecting a potential distribution on the transparent conductor layer 12. Furthermore, it is possible to detect a contact position that moves, by time-divisionally scanning the plurality of conductive regions on the transparent conductor layer 12 and detecting the potential via the plurality of conductive regions. It is also possible to accurately detect the coordinate position of the contact position that moves, by detecting the potential distribution on the transparent conductor layer 12.

Figure 9:
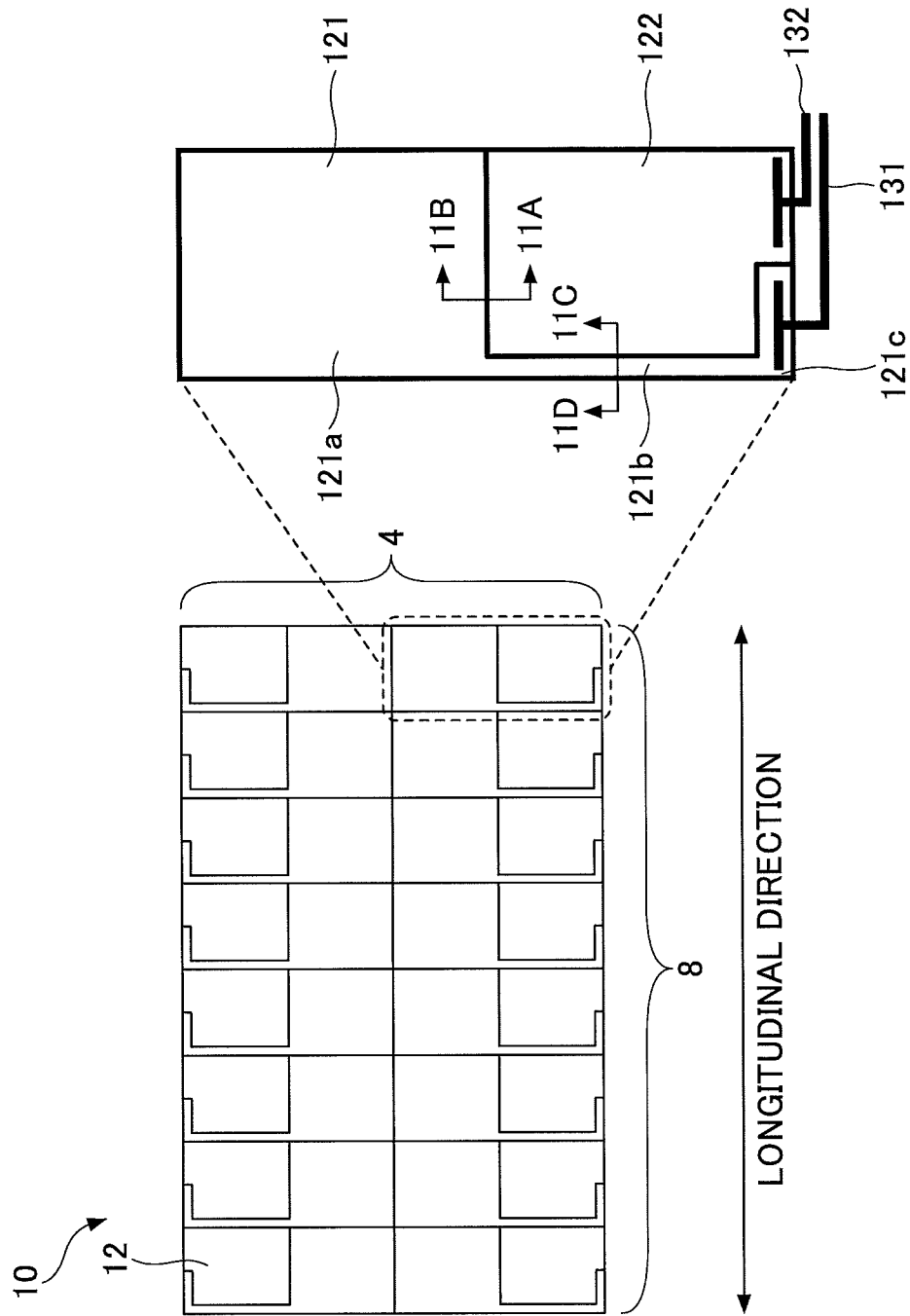
FIG. 9 is a diagram for explaining conductive regions of the upper electrode substrate of the touchscreen panel in the first embodiment.

Next, a description will be given of the conductive regions that segments the transparent conductor layer 12 of the upper electrode substrate 10, by referring to FIG. 9. FIG. 9 is a diagram for explaining the conductive regions of the upper electrode substrate of the touchscreen panel in the first embodiment. A left part of FIG. 9 illustrates a plan view of the upper electrode substrate 10, and a portion of the upper electrode substrate 10 surrounded by dotted lines is illustrated on an enlarged scale in a right part of FIG. 9.

In FIG. 9, the transparent conductor layer 12 is segmented into 4 approximately rectangular conductive regions along the shorter side thereof (or vertical direction), and is segmented into 8 approximately rectangular conductive regions along the longer side thereof (or horizontal direction). The 32 conductive regions are grouped into 2 upper rows along the horizontal direction, and 2 lower rows along the horizontal direction. As illustrated in FIG. 5, the 2 upper rows of conductive regions are connected to the leader electrodes of the electrode part 13 that is provided along the upper end of the upper electrode substrate 10, and the 2 lower rows of conductive regions are connected to the leader electrodes of the electrode part 13 that is provided along the lower end of the upper electrode substrate 10.

In this embodiment, the touchscreen panel is designed to be mainly operated by the fingers of the user. For this reason, each of the conductive regions has an approximately rectangular shape or an approximately square shape, and the longer side of the approximately rectangular shape or one side of the approximately square shape of the largest conductive region is preferably 25 mm or less, and more preferably 20 mm or less. The upper limit of the size of the conductive region may be determined based on the size of the fingers in order to enable multiple contact positions that are pressed simultaneously by the fingers of the user to be detected independently. In other words, if one side of the conductive region is shorter than the distance between two finger tips of the user, it is possible to independently detect multiple contact positions that are pressed simultaneously by the finger tips. On the other hand, the longer side of the approximately rectangular shape or one side of the square shape of the largest conductive region is preferably 5 mm or greater, and more preferably 7 mm or greater. The lower limit of the size of the conductive region may be determined based on the size of leader electrodes which will be described later. In other words, if one side (or the longer side) of the conductive region is less than 0.5 mm and too small, for example, the area occupied by the leader electrode in relation to the conductive region increases, to thereby deteriorate the performance of the touchscreen panel.

Accordingly, the upper and lower limits of the size of the conductive region may be determined based on the position detection accuracy required of the touchscreen panel, the ease with which the touchscreen panel is to be operated by the finger tips of the user, and the like.

As illustrated in the right part of FIG. 9, the 2 conductive regions of the transparent conductor layer 12 in the 2 lower rows of the upper electrode substrate 10, at the rightmost column, are formed by a conductive region 121 and a conductive region 122. The 2 conductive regions of the transparent conductor layer 12 in the 2 lower rows, at each of the 8 columns, are formed by the conductive region 121 and the conductive region 122 in a manner similar to the 2 conductive regions in the 2 lower rows at the rightmost column. On the other hand, the 2 conductive regions of the transparent conductor layer 12 in the 2 upper rows of the upper electrode substrate 10, at the rightmost column, are formed by the conductive region 121 and the conductive region 122 that are arranged with a pattern that is upside-down relative to the pattern illustrated in the right part of FIG. 9. The 2 conductive regions of the transparent conductor layer 12 in the 2 upper rows, at each of the 8 columns, are formed by the conductive region 121 and the conductive region 122 in a manner similar to the 2 conductive regions in the 2 upper rows at the rightmost column.

Hence, the conductive regions of the transparent conductor layer 12 in the upper rows may be arranged with a pattern that is upside-down relative to the pattern with which the conductive regions of the transparent conductor layer 12 in the lower rows are arranged, with respect to each column. Basically, this symmetrical arrangement of the patterns of the conductive regions of the transparent conductor layer 12 in the upper and lower rows, with respect to each column, is basically applicable to the embodiments described hereunder. In other words, the conductive regions in the upper rows in an upper half of the array and the conductive regions in lower rows in a lower half of the array have symmetrical patterns about a boundary between the upper and lower halves of the array.

As illustrated on the enlarged scale in the right part of FIG. 9, the conductive region 122 contacts one of the longer sides (that is, the lower side) of the upper electrode substrate 10. On the other hand, the conductive region 121 has a region part 121a, a leader part 121b which extends from the region part 121a along one side (that is, the left side) of the conductive region 122, and a contact part 121c that connects the leader part 121b and one of the longer sides (that is, the lower side) of the upper electrode substrate 10. In other words, the leader part 121b is formed between the conductive regions 121 and 122 that connect to one of the longer sides (that is, the lower side) of the upper electrode substrate 10. In order to prevent an erroneous position detection, the leader part 121b is preferably narrow along the longitudinal direction of the upper electrode substrate 10.

The conductive region 121 connects to a leader electrode 131 at the contact part 121c, and the conductive region 122 connects to a leader electrode 132 at one of the longer sides (that is, the lower side) of the upper electrode substrate 10. The contact part 121c of the conductive region 121 may be connected to the leader electrode 131 by applying silver paste (or solder paste) on the contact part 121c. Similarly, the conductive region 122 may be connected to the leader electrode 132 by applying silver paste (or solder paste) on the conductive region 122 in a vicinity of one of the longer sides (that is, the lower side) of the upper electrode substrate 10. A plurality of such leader electrodes 131 and 132 form the leader electrode part 13 illustrated in FIG. 5.

Figure 10:
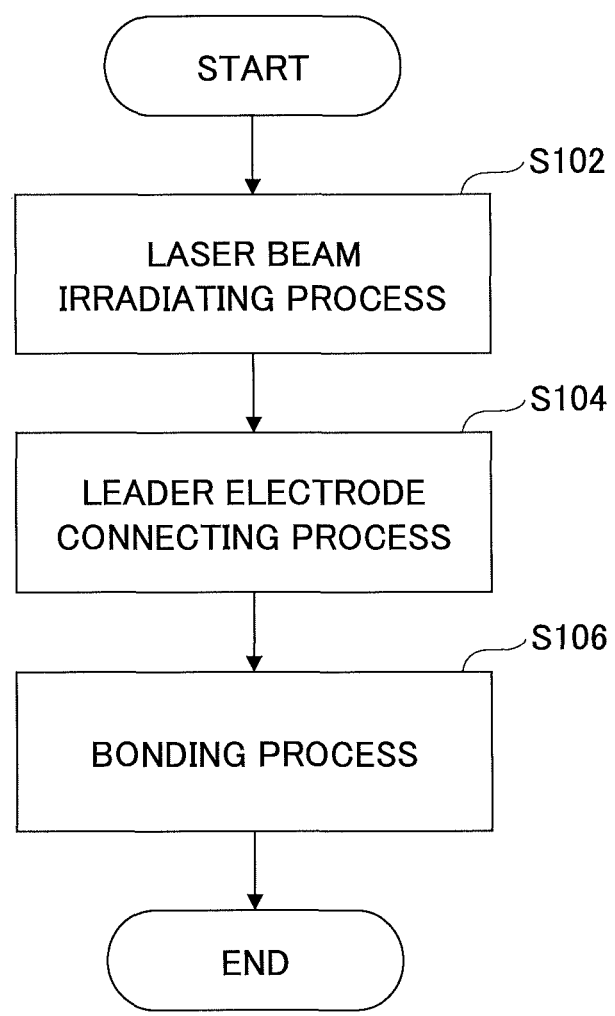
FIG. 10 is a flow chart for explaining a method of fabricating the touchscreen panel in the first embodiment.

Next, a description will be given of a method of fabricating the touchscreen panel in this embodiment. FIG. 10 is a flow chart for explaining the method of fabricating the touchscreen panel in the first embodiment. It is assumed for the sake of convenience that the upper electrode substrate 10 has the transparent conductor layer 12 formed on the film 11 thereof.

First, a step S102 performs a laser beam irradiating process to irradiate a laser beam on the transparent conductor layer 12 of the upper electrode substrate 10, in order to form the gap between the mutually adjacent conductive regions of the transparent conductor layer 12. Portions of the transparent conductor layer 12 irradiated by the laser beam are removed due to heat or ablation caused by the laser beam. The gap between the mutually adjacent conductive regions of the transparent conductor layer 12 electrically insulates the mutually adjacent conductive regions from each other.

The step S102 may be performed when the upper electrode substrate 10 is formed, independently of the forming of the lower electrode substrate 20, as long as the step S102 is performed before the step S104.

Of course, charged particle beams other than the laser beam, such as an electron beam, may be used to remove portions of the transparent conductor layer 122 in order to form the gap between the mutually adjacent conductive regions of the transparent conductor layer 12.

Figure 11A:
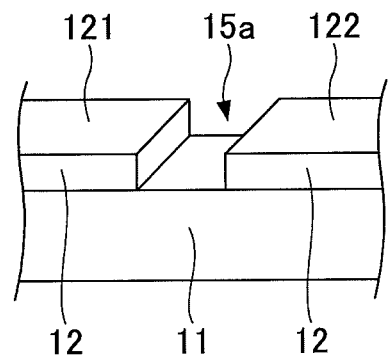
FIGS. 11A and 11B are perspective views for explaining the method of fabricating the touchscreen panel in the first embodiment.
Figure 11B:
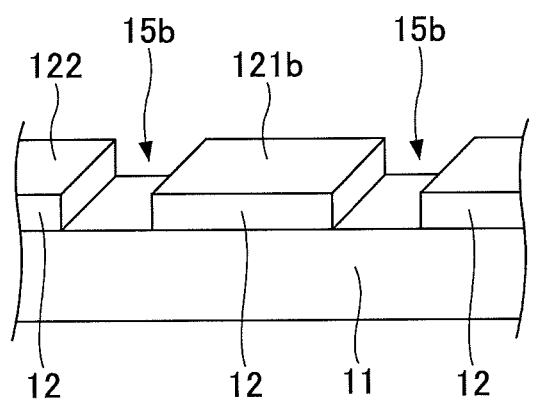

FIGS. 11A and 11B are perspective views for explaining the method of fabricating the touchscreen panel in the first embodiment. FIG. 11A illustrates a perspective view of a cross section cut along a line 11A-11B in the right part of FIG. 9. By irradiating the laser beam on the transparent conductor layer 12, a portion of the transparent conductor layer 12 is removed to form a removed region 15a. The removed region 15a separates the transparent conductor layer 12 into the conductive regions 121 and 122. FIG. 11B illustrates a perspective view of a cross section cut along a line 11C-11D in the right part of FIG. 9. By irradiating the laser beam on the transparent conductor layer 12, portions of the transparent conductor layer 12 are removed to form removed regions 15b. The removed regions 15b separate the transparent conductor layer 12 to form the leader part 121b of the conductive region 121. The transparent conductor layer 12 is completely removed at the removed regions 15a and 15b, and thus, the adjacent conductive regions, such as the conductive regions 121 and 122, are positively insulated from each other.

The method of removing portions of the transparent conductor layer 12 is not limited to the method that uses the charged particle beam. For example, a photoresist layer may be formed on the transparent conductor layer 12, and a resist pattern corresponding to a pattern of the conductive regions may be exposed by an exposure apparatus and developed. The transparent conductor layer 12 may be removed at portions where the resist pattern is not formed, by a wet etching or a dry etching. Alternatively, an etching paste may be printed on regions of the transparent conductor layer 12 to be removed, in order to remove the regions printed with the etching paste by the etching. However, in a case where the wet etching is employed as the method of removal, it is difficult to make the width of the conductive region of the transparent conductor layer 12 that is removed narrow and to remove the conductive regions linearly, and in this case, the visibility of the display through the transparent conductor layer 12 deteriorates and the display quality of the touchscreen panel becomes poor. On the other hand, in a case where the dry etching is employed as the method of removal, the cost of fabricating the touchscreen panel becomes relatively high. Accordingly, the method that uses the charged particle beam, such as the laser beam, as the method of removal, is suited for fabricating the touchscreen panel, in that the removed regions 15a and 15b can be formed linearly and to have a narrow width at a relatively low cost.

For example, the wavelength of the laser beam used in the step S102 is 355 nm. The transparent conductor layer 12 may be removed by continuously irradiating the repetitive pulse laser thereon. A spot diameter of the laser beam irradiated on the transparent conductor layer 12 may be 10 μm to 100 μm, for example, and the width of the transparent conductor layer 12 that is removed may be 10 μm to 100 μm that corresponds to the spot diameter. When the laser beam having the wavelength of 355 nm is used, the transparent conductor layer 12 can be removed but the film 11 remains substantially unaffected by the laser beam. As a result, it is possible to uniformly form the leader part 121b that is long and narrow.

Preferably, the wavelength of the laser beam enables the material forming the transparent conductor layer 12 to absorb the laser beam and the material forming the film 11 to transmit the laser beam. In order to efficiently remove the transparent conductor layer 12, the laser beam is absorbed only by the transparent conductor layer 12 so that the transparent conductor layer 12 may be removed linearly and the touchscreen panel may be fabricated without deteriorating the display quality thereof. In addition, in order for the removed regions of the transparent conductor layer 12 to be visually inconspicuous and for the visibility of the display of the touchscreen panel to be unaffected by the laser beam, a difference between the reflectance of the surface of the transparent conductor layer 12 and the reflectance of the surface of the film 11 in the visible region is preferably 1% or less. If the difference between the reflectance of the surface of the transparent conductor layer 12 and the reflectance of the surface of the film 11 in the visible region is 1% or less and small, the removed regions of the transparent conductor layer 12 are visually inconspicuous and will not affect the visibility of the display of the touchscreen panel. In this embodiment, the transparent conductor layer 12 is made of ITO, for example, and the reflectance of the surface thereof is approximately 3.5% in the visible region. On the other hand, the film 11 is made of PET, for example, and the reflectance of the surface thereof is approximately 3%. Accordingly, the difference between the reflectance of the surface of the transparent conductor layer 12 and the reflectance of the surface of the film 11 in the visible region is 0.5%, which is less than 1%. Of course, the material forming the film 11 is not limited to PET, and any suitable material that is transparent in the visible region, including PC and resins, may be used to form the film 11.

By the laser beam irradiating process of the step S102, the conductive region 122, and the region part 121a, the leader part 121b and the contact part 121c of the conductive region 121 are formed as illustrated in the right part of FIG. 9.

Next, a step S104 performs a leader electrode connecting process to connect the leader electrodes. More particularly, silver paste (or solder paste) is applied on the conductive region 122 of the transparent conductor layer 12 in the vicinity of one of the longer sides (that is, the lower side) of the upper electrode substrate 10 and on the transparent conductor layer 12 at the contact part 121c that is formed by the step S102, to connect the conductive region 122 to the leader electrode 132 and the contact part 121c to the leader electrode 131. Leader electrodes are similarly connected to the conductive regions 121 and 122 in each of the upper 2 rows and the lower 2 rows, with respect to each column of the conductive regions.

Then, a step S106 performs a bonding process to bond the upper electrode substrate 10 and the lower electrode substrate 20 via the spacer 31 or the like, so that the transparent conductor layers 12 and 22 oppose each other via the spacer 31. The FPC 14 is connected to one end of the upper electrode substrate 10, and the FPC 27 is connected to one end of the lower electrode substrate 20.

The touchscreen panel of this embodiment is fabricated by performing the steps S102, S104 and S106 described above.

If the width of the transparent conductor layer 12 that is removed is too wide, undetectable regions in which the contact position cannot be detected increase on the touchscreen panel, and the visibility of the display through the transparent conductor layer 12 of the upper electrode substrate 10 deteriorates, to thereby deteriorate the performance of the touchscreen panel. In addition, the top electrode substrate 10 of the touchscreen panel is pressed by the finger tips of the user or by pens or styluses manipulated by the user, and the tip ends of the pens or styluses have a radius of approximately 0.8 mm. For these reasons, it may be regarded that the performance of the touchscreen panel can be secured if the width of the transparent conductor layer 12 that is removed is 1 mm or less. On the other hand, if the width of the transparent conductor layer 12 that is removed is less than 0.1 µm and too narrow, for example, an unwanted capacitance may be generated between two mutually adjacent conductive regions of the transparent conductor layer 12 and deteriorate the performance of the touchscreen panel. Accordingly, the width of the transparent conductor layer 12 that is removed, that is, the width of the gap insulating two mutually adjacent conductive regions of the transparent conductor layer 12, is preferably in a range of 0.1 µm to 1 mm, and more preferably in a range of 10 µm to 100 µm, in order maintain a satisfactory performance of the touchscreen panel.

Figure 12:
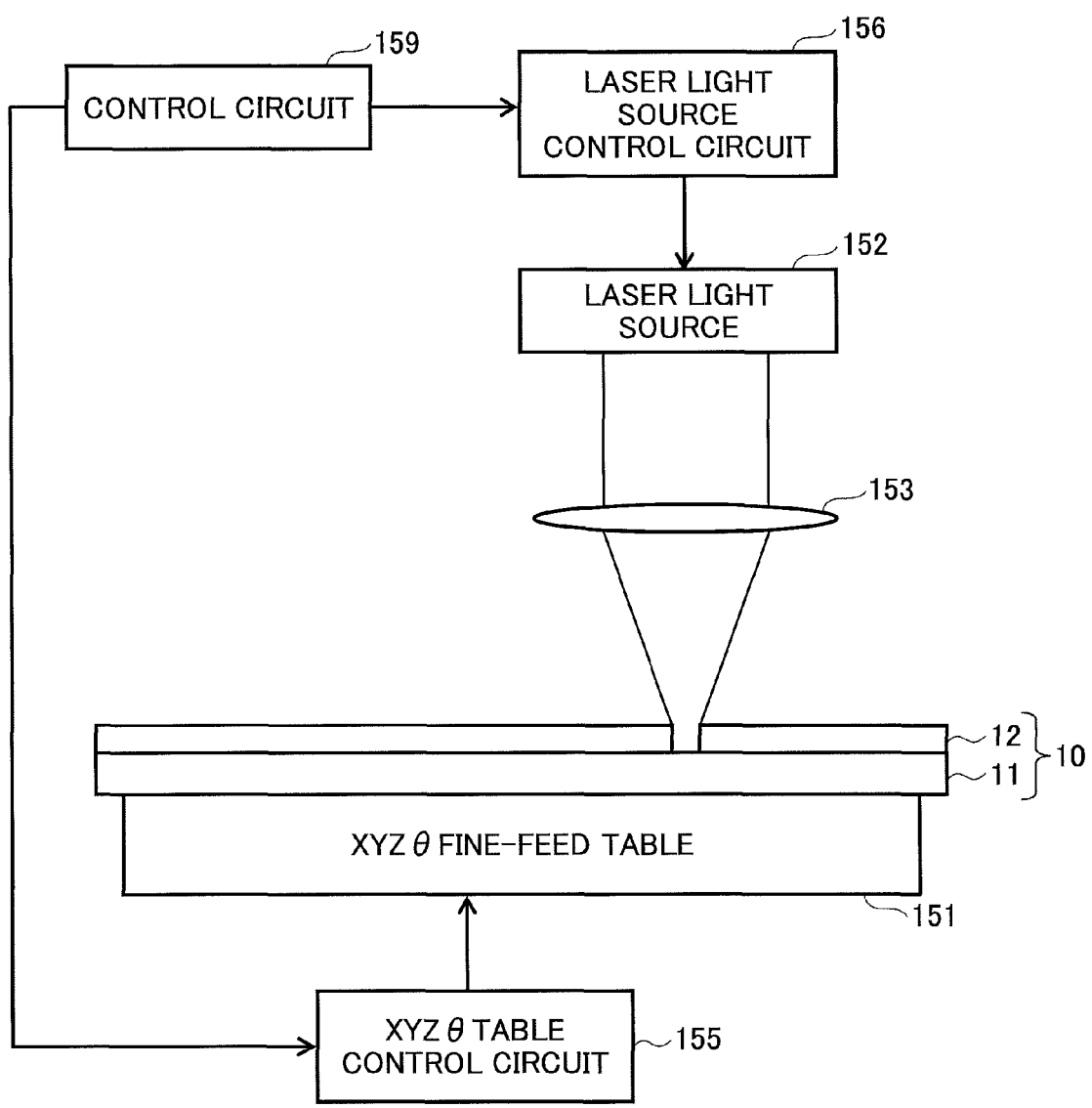
FIG. 12 is a diagram illustrating a laser beam irradiating apparatus that is used by the method of fabricating the touchscreen panel in the first embodiment.

Next, a description will be given of a laser beam irradiating apparatus that is used to remove the transparent conductor layer 12 of the upper electrode substrate 10, by referring to FIG. 12. FIG. 12 is a diagram illustrating the laser beam irradiating apparatus that is used by the method of fabricating the touchscreen panel in the first embodiment. In FIG. 12, the upper electrode substrate 10 is set on an XYZθ fine-feed table 151 with the transparent conductor layer 12 facing up. For example, the XYZθ fine-feed table 151 is movable along the x-axis, the y-axis and the z-axis of the XYZ coordinate system, and may also rotate by an angle θ on the xy-plane, for example.

On the other hand, a laser light source 152 that emits a laser beam having a wavelength of 355 nm, is provided above the XYZθ fine-feed table 151. The laser beam from the laser light source 152 is converged on the surface of the transparent conductor layer 12 via a lens 153. The laser light emission from the laser light source 152 is controlled by a laser light source control circuit 156.

A table control circuit 155 controls the movement and position of the XYZθ fine-feed table 151. A control circuit 159 may be formed by a processor, such as a Central Processing Unit (CPU), and controls the table control circuit 155 in order to adjust the position of the upper electrode substrate 10 relative to the irradiating position (or spot) of the laser beam. Furthermore, the control circuit 159 controls the laser light source control circuit 156 in order to adjust the power of the laser beam emitted from the laser light source 152. As a result, the region of the transparent conductor layer 12 of the upper electrode substrate 10, irradiated by the laser beam, is removed to insulate the mutually adjacent conductive regions from each other.

FIG. 13 is a diagram illustrating relationships of frequency and energy of the laser beam that is irradiated from the laser light source 152 and a quality of the upper electrode substrate 10. In this case, the quality of the upper electrode substrate 10 refers to the removed state of the transparent conductor layer 12 irradiated by the laser beam. In FIG. 13, a symbol "o" indicates a satisfactory removal of the transparent conductor layer 12, a symbol "Δ" indicates a fair removal of the transparent conductor layer 12 that is not as satisfactory as the satisfactory removal, and a symbol "x" indicates an unsatisfactory (or unacceptable) removal of the transparent conductor layer 12. It may be seen from FIG. 13 that the satisfactory removal of the transparent conductor layer 12 is achievable when the frequency of the irradiated laser beam is in a range of 20 kHz to 100 kHz and the energy of the irradiated laser beam is in a range of 40 µJ to 300 µJ. However, the transparent conductor layer 12 cannot be removed completely by the laser beam having the low frequency and the low energy. On the other hand, the laser beam having the high frequency and the high energy will remove the film 11 in addition to the transparent conductor layer 12. Accordingly, the laser beam having a frequency in a range of 80 kHz to 100 kHz desirably has an energy in a range of 40 µJ to 50 µJ, and the laser beam having a frequency in a range of 20 kHz to 40 kHz desirably has an energy in a range of 240 µJ to 300 µJ.

Second Embodiment

Figure 14:
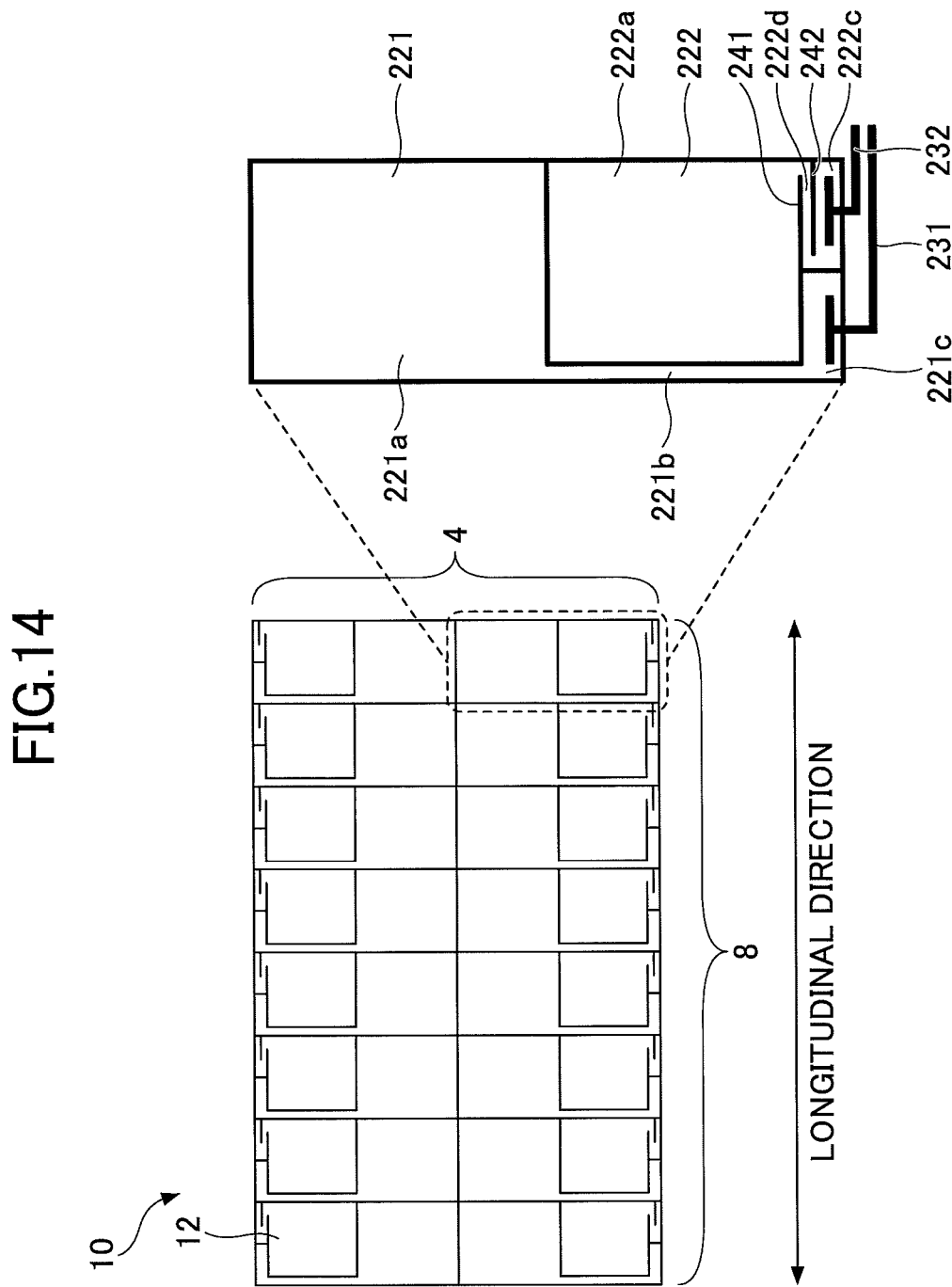
FIG. 14 is a diagram for explaining conductive regions of the upper electrode substrate of the touchscreen panel in a second embodiment of the present invention.

Next, a description will be given of a touchscreen panel in a second embodiment of the present invention, by referring to FIG. 14. FIG. 14 is a diagram for explaining conductive regions of the upper electrode substrate of the touchscreen panel in the second embodiment of the present invention. A left part of FIG. 14 illustrates a plan view of the upper electrode substrate 10, and a portion of the upper electrode substrate 10 surrounded by dotted lines is illustrated on an enlarged scale in a right part of FIG. 14. In FIG. 14, those parts that are the same as those corresponding parts in FIG. 9 are designated by the same reference numerals, and a description thereof will be omitted.

In FIG. 14, the transparent conductor layer 12 is segmented into 4 approximately rectangular conductive regions along the shorter side thereof (or vertical direction), and is segmented into 8 approximately rectangular conductive regions along the longer side thereof (or horizontal direction). The 32 conductive regions are grouped into 2 upper rows along the horizontal direction, and 2 lower rows along the horizontal direction.

As illustrated in the right part of FIG. 14, the 2 conductive regions of the transparent conductor layer 12 in the 2 lower rows of the upper electrode substrate 10, at the rightmost column, are formed by a conductive region 221 and a conductive region 222. The 2 conductive regions of the transparent conductor layer 12 in the 2 lower rows, at each of the 8 columns, are formed by the conductive region 221 and the conductive region 222 in a manner similar to the 2 conductive regions in the 2 lower rows at the rightmost column. On the other hand, the 2 conductive regions of the transparent conductor layer 12 in the 2 upper rows of the upper electrode substrate 10, at the rightmost column, are formed by the conductive region 221 and the conductive region 222 that are arranged with a pattern that is upside-down relative to the pattern illustrated in the right part of FIG. 14. The 2 conductive regions of the transparent conductor layer 12 in the 2 upper rows, at each of the 8 columns, are formed by the conductive region 221 and the conductive region 222 in a manner similar to the 2 conductive regions in the 2 upper rows at the rightmost column.

As illustrated on the enlarged scale in the right part of FIG. 14, the conductive region 222 contacts one of the longer sides (that is, the lower side) of the upper electrode substrate 10. On the other hand, the conductive region 221 has a region part 221a, a leader part 221b which extends from the region part 221a along one side (that is, the left side) of the conductive region 222, and a contact part 221c that connects the leader part 221b and one of the longer sides (that is, the lower side) of the upper electrode substrate 10. In other words, the leader part 221b is formed between the conductive regions 221 and 222 that connect to one of the longer sides (that is, the lower side) of the upper electrode substrate 10. In order to prevent an erroneous position detection, the leader part 221b is preferably narrow along the longitudinal direction of the upper electrode substrate 10.

The conductive region 222 includes removed regions 241 and 242 in which the transparent conductor layer 12 is removed. Hence, the conductive region 222 has a region part 222a in which the contact position is detected, a resistor part 222d that is formed between the removed regions 241 and 242, and a contact part 222c. The resistor part 222d is formed between the region part 222a and the contact part 222c.

The removed region 241 does not extend to a vicinity of the right side of the conductive region 222 of the transparent conductor layer 12 along the longitudinal direction of the upper electrode substrate 10, and the removed region 242 does not extend to a vicinity of the left side (or central portion) of the conductive region 222 of the transparent conductor layer 12 along the longitudinal direction of the upper electrode substrate 10. Consequently, the resistor part 222d of the transparent conductor layer 12 has a relatively long electrical path, and the resistance of the resistor part 222d may be set relatively large. The resistance of the resistor part 222d is adjusted to be the same as or, approximately the same as the resistance of the leader part 221b. In other words, the gap between the removed regions 241 and 242 along a direction perpendicular to the longitudinal direction of the upper electrode substrate 10, and the lengths of the removed regions 241 and 242 along the longitudinal direction of the upper electrode substrate 10 (and thus the length of the electrical path of the resistor part 222d) are adjusted so that the resistance of the resistor part 222d is adjusted to be the same as or, approximately the same as the resistance of the leader part 221b. The removed regions 241 and 242 may be formed by removing the transparent conductor layer 12 in the same manner as when forming the gap between the mutually adjacent conductive regions of the transparent conductor layer 12 in order to insulate the mutually adjacent conductive regions. Hence, the laser beam may be used to form the removed regions 241 and 242.

From the point of view of minimizing alignments of patterns and fabrication costs, the removed regions 241 and 242 are preferably formed to extend in the same direction for each of the conductive regions of the transparent conductor layer 12. In addition, the removed regions 241 and 242 of the conductive regions of the transparent conductor layer 12 belonging to the same column are preferably aligned in the direction perpendicular to the longitudinal direction of the upper electrode substrate 10.

The conductive region 221 connects to a leader electrode 231 at the contact part 221c, and the conductive region 222 connects to a leader electrode 232 at the contact part 222c. The contact part 221c of the conductive region 221 may be connected to the leader electrode 231 by applying silver paste (or solder paste) on the contact part 221c. Similarly, the conductive region 222 may be connected to the leader electrode 232 by applying silver paste (or solder paste) on the contact part 222c.

Accordingly, in this embodiment, the resistance from the leader electrode 231 to the region part 221a of the conductive region 221 is the same as or, approximately the same as the resistance from the leader electrode 232 to the region part 222a of the conductive region 222. By making the resistance from the leader electrode to the region part of the conductive region the same for each of the conductive regions of the transparent conductor layer 12, it becomes unnecessary to provide resistors or the like in the driving circuit which drives the touchscreen panel that are otherwise required to compensate for the different threshold potentials for detecting the contact positions when the resistance from the leader electrode to the region part of the conductive region is different among the conductive regions of the transparent conductor layer 12. As a result, the touchscreen panel which enables simultaneous detection of multiple contact positions can be fabricated at a relatively low cost, because there is no need to perform a complex operation that is otherwise required to detect the multiple contact positions by the driving circuit if different threshold potentials are used to detect the multiple contact positions.

Third Embodiment

Figure 15:
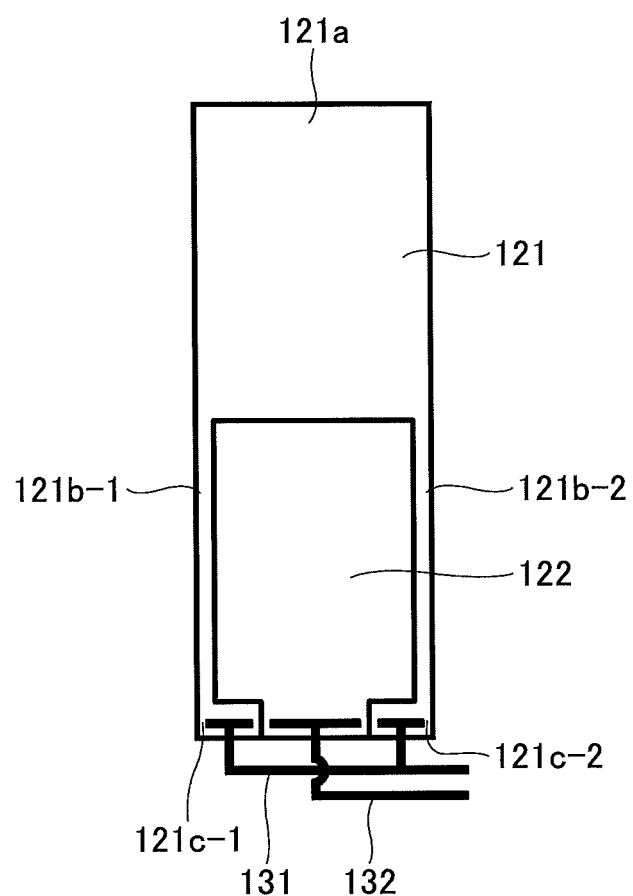
FIG. 15 is a diagram for explaining conductive regions of the upper electrode substrate of the touchscreen panel in a third embodiment of the present invention.

Next, a description will be given of a touchscreen panel in a third embodiment of the present invention, by referring to FIG. 15. FIG. 15 is a diagram for explaining conductive regions of the upper electrode substrate of the touchscreen panel in the third embodiment of the present invention. FIG. 15 illustrates a portion of the upper electrode substrate 10 surrounded by dotted lines in FIG. 9 on an enlarged scale. In FIG. 15, those parts having functions that are substantially the same as the functions of those corresponding parts in FIG. 9 are designated by the same reference numerals.

As illustrated in FIG. 15, a conductive region 122 contacts one of the longer sides (that is, the lower side) of the upper electrode substrate 10. On the other hand, a conductive region 121 has a region part 121a, leader parts 121b-1 and 121b-2 which extend from the region part 121a along respective sides (that is, the left and right sides) of the conductive region 122, and contact parts 121c-1 and 121c-2 that respectively connect the leader parts 121b-1 and 121b-2 and one of the longer sides (that is, the lower side) of the upper electrode substrate 10. In other words, the leader parts 121b-1 and 121b-2 are formed between the conductive regions 121 and 122 that connect to one of the longer sides (that is, the lower side) of the upper electrode substrate 10. In order to prevent an erroneous position detection, the leader parts 121b-1 and 121b-2 are preferably narrow along the longitudinal direction of the upper electrode substrate 10.

The conductive region 121 connects to a leader electrode 131 at the contact parts 121c-1 and 121c-2, and the conductive region 122 connects to a leader electrode 132 at one of the longer sides (that is, the lower side) of the upper electrode substrate 10. The contact parts 121c-1 and 121c-2 of the conductive region 121 may be connected to the leader electrode 131 by applying silver paste (or solder paste) on the contact parts 121c-1 and 121c-2. Similarly, the conductive region 122 may be connected to the leader electrode 132 by applying silver paste (or solder paste) on the conductive region 122 in a vicinity of one of the longer sides (that is, the lower side) of the upper electrode substrate 10.

In the case of the first embodiment illustrated in FIG. 9, the resistance between the region part 121a and the contact part 121c may become high if the leader part 121b is considerably narrow along the longitudinal direction of the upper electrode substrate 10. But when the pair of leader parts 121b-1 and 121b-2 are provided between the region part 121a and the contact part 121c as illustrated in FIG. 15, it is possible to suppress the increase in the resistance between the region part 121a and the contact part 121c even if each of the leader parts 121b-1 and 121b-2 is considerably narrow along the longitudinal direction of the upper electrode substrate 10.

Fourth Embodiment

Figure 16:
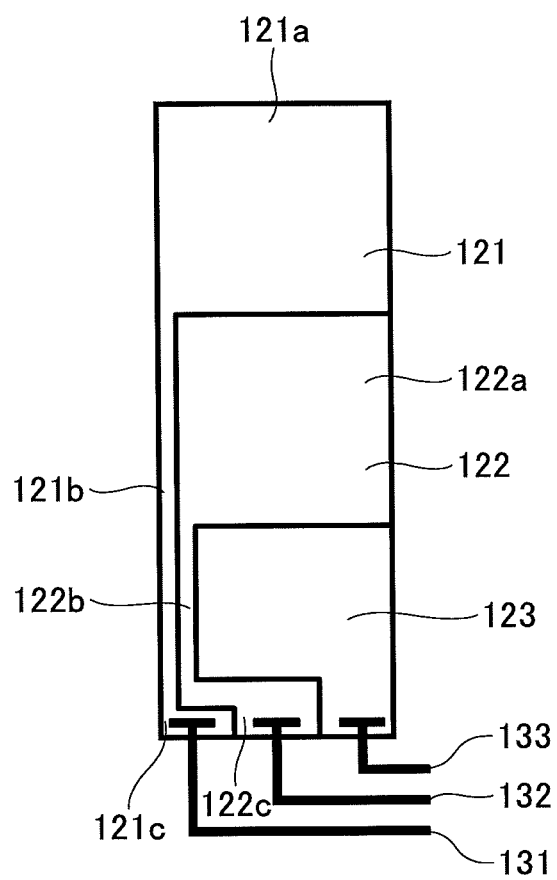
FIG. 16 is a diagram for explaining conductive regions of the upper electrode substrate of the touchscreen panel in a fourth embodiment of the present invention.

Next, a description will be given of a touchscreen panel in a fourth embodiment of the present invention, by referring to FIG. 16. FIG. 16 is a diagram for explaining conductive regions of the upper electrode substrate of the touchscreen panel in the fourth embodiment of the present invention. FIG. 16 illustrates a portion of the upper electrode substrate 10, having the transparent conductor layer 12 segmented into M=6 conductive regions along a shorter side thereof (or vertical direction) and segmented into N=8 conductive regions along a longer side thereof (or horizontal direction, for example, on an enlarged scale. The 48 conductive regions are grouped into 3 upper rows along the horizontal direction, and 3 lower rows along the horizontal direction. In FIG. 16, those parts having functions that are substantially the same as the functions of those corresponding parts in FIG. 9 are designated by the same reference numerals.

As illustrated in FIG. 16, the 3 conductive regions of the transparent conductor layer 12 in the 3 lower rows of the upper electrode substrate 10, at the rightmost column, for example, are formed by a conductive region 121, a conductive region 122, and a conductive region 123. The conductive region 123 contacts one of the longer sides (that is, the lower side) of the upper electrode substrate 10. On the other hand, the conductive region 121 has a region part 121a, a leader part 121b which extends from the region part 121a along one side (that is, the left side) of the conductive regions 122 and 123, and a contact part 121c that connects the leader part 121b and one of the longer sides (that is, the lower side) of the upper electrode substrate 10. In other words, the leader part 121b is formed between the conductive region 121 and the conductive regions 122 and 123 that connect to one of the longer sides (that is, the lower side) of the upper electrode substrate 10. In addition, the conductive region 122 has a region part 122a, a leader part 122b which extends from the region part 122a along one side (that is, the left side) of the conductive region 123, and a contact part 122c that connects the leader part 122b and one of the longer sides (that is, the lower side) of the upper electrode substrate 10. In other words, the leader part 122b is formed between the conductive region 122 and the conductive region 123 that connects to one of the longer sides (that is, the lower side) of the upper electrode substrate 10. In order to prevent an erroneous position detection, the leader parts 121b and 122b are preferably narrow along the longitudinal direction of the upper electrode substrate 10.

Moreover, the resistance from the region part 121a to the contact part 121c of the conductive region 121 is preferably the same as or, approximately the same as the resistance from the region part 122a to the contact part 122c of the conductive region 122. Hence, the width of the leader part 121b along the longitudinal direction of the upper electrode substrate 10 is made wider than the width of the leader part 122b.

The conductive region 121 connects to a leader electrode 131 at the contact part 121c, the conductive region 122 connects to a leader electrode 132 at the contact part 122c, and the conductive region 123 connects to a leader electrode 133 at one of the longer sides (that is, the lower side) of the upper electrode substrate 10. The contact part 121c of the conductive region 121 may be connected to the leader electrode 131 by applying silver paste (or solder paste) on the contact part 121c, and the contact part 122c of the conductive region 122 may be connected to the leader electrode 132 by applying silver paste (or solder paste) on the contact part 122c. Similarly, the conductive region 123 may be connected to the leader electrode 133 by applying silver paste (or solder paste) on the conductive region 123 in a vicinity of one of the longer sides (that is, the lower side) of the upper electrode substrate 10. A plurality of such leader electrodes 131, 132 and 133 form the leader electrode part 13 illustrated in FIG. 5.

Fifth Embodiment

Figure 17:
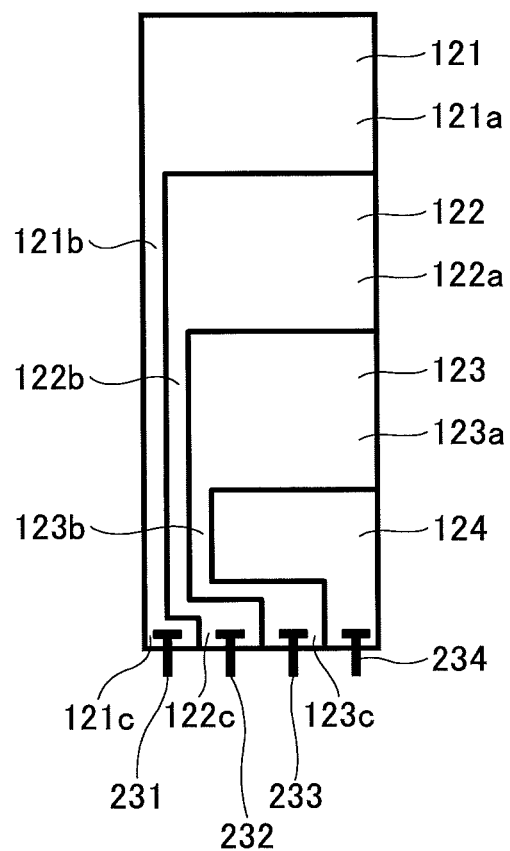
FIG. 17 is a diagram for explaining conductive regions of the upper electrode substrate of the touchscreen panel in a fifth embodiment of the present invention.

Next, a description will be given of a touchscreen panel in a fifth embodiment of the present invention, by referring to FIG. 17. FIG. 17 is a diagram for explaining conductive regions of the upper electrode substrate of the touchscreen panel in the fifth embodiment of the present invention. FIG. 17 illustrates a portion of the upper electrode substrate 10, having the transparent conductor layer 12 segmented into M=4 conductive regions along a shorter side thereof (or vertical direction) and segmented into N=8 conductive regions along a longer side thereof (or horizontal direction, for example, on an enlarged scale. The 64 conductive regions are grouped into 4 upper rows along the horizontal direction, and 4 lower rows along the horizontal direction. In FIG. 17, those parts having functions that are substantially the same as the functions of those corresponding parts in FIG. 9 are designated by the same reference numerals.

As illustrated in FIG. 17, the 4 conductive regions of the transparent conductor layer 12 in the 4 lower rows of the upper electrode substrate 10, at the rightmost column, for example, are formed by a conductive region 121, a conductive region 122, a conductive region 123, and a conductive region 124. The conductive region 124 contacts one of the longer sides (that is, the lower side) of the upper electrode substrate 10. On the other hand, the conductive region 121 has a region part 121a, a leader part 121b which extends from the region part 121a along one side (that is, the left side) of the conductive regions 122, 123 and 124, and a contact part 121c that connects the leader part 121b and one of the longer sides (that is, the lower side) of the upper electrode substrate 10. In other words, the leader part 121b is formed between the conductive region 121 and the conductive regions 122, 123 and 124 that connect to one of the longer sides (that is, the lower side) of the upper electrode substrate 10. The conductive region 122 has a region part 122a, a leader part 122b which extends from the region part 122a along one side (that is, the left side) of the conductive regions 123 and 124, and a contact part 122c that connects the leader part 122b and one of the longer sides (that is, the lower side) of the upper electrode substrate 10. In other words, the leader part 122b is formed between the conductive region 122 and the conductive regions 123 and 124 that connect to one of the longer sides (that is, the lower side) of the upper electrode substrate 10. In addition, the conductive region 123 has a region part 123a, a leader part 123b which extends from the region part 123a along one side (that is, the left side) of the conductive region 124, and a contact part 123c that connects the leader part 123b and one of the longer sides (that is, the lower side) of the upper electrode substrate 10. In other words, the leader part 123b is formed between the conductive region 123 and the conductive region 124 that connects to one of the longer sides (that is, the lower side) of the upper electrode substrate 10. In order to prevent an erroneous position detection, the leader parts 121b, 122b and 123b are preferably narrow along the longitudinal direction of the upper electrode substrate 10.

Moreover, the resistance from the region part 121a to the contact part 121c of the conductive region 121, the resistance from the region part 122a to the contact part 122c of the region 122, and the resistance from the region part 123a to the contact part 123c of the region 123 are preferably the same or, approximately the same. Hence, the width of the leader part 121b along the longitudinal direction of the upper electrode substrate 10 is made wider than the width of the leader part 122b, and the width of the leader part 122b along the longitudinal direction of the upper electrode substrate 10 is made wider than the width of the leader part 123b.

The conductive region 121 connects to a leader electrode 231 at the contact part 121c, the conductive region 122 connects to a leader electrode 232 at the contact part 122c, the conductive region 123 connects to a leader electrode 233 at the contact part 123c, and the conductive region 124 connects to a leader electrode 234 at one of the longer sides (that is, the lower side) of the upper electrode substrate 10. The contact part 121c of the conductive region 121 may be connected to the leader electrode 231 by applying silver paste (or solder paste) on the contact part 121c, the contact part 122c of the conductive region 122 may be connected to the leader electrode 232 by applying silver paste (or solder paste) on the contact part 122c, and the contact part 123c of the conductive region 123 may be connected to the leader electrode 233 by applying silver paste (or solder paste) on the contact part 123c. Similarly, the conductive region 124 may be connected to the leader electrode 234 by applying silver paste (or solder paste) on the conductive region 124 in a vicinity of one of the longer sides (that is, the lower side) of the upper electrode substrate 10. A plurality of such leader electrodes 231, 232, 233 and 234 form the leader electrode part 13 illustrated in FIG. 5.

Sixth Embodiment

Figure 18:
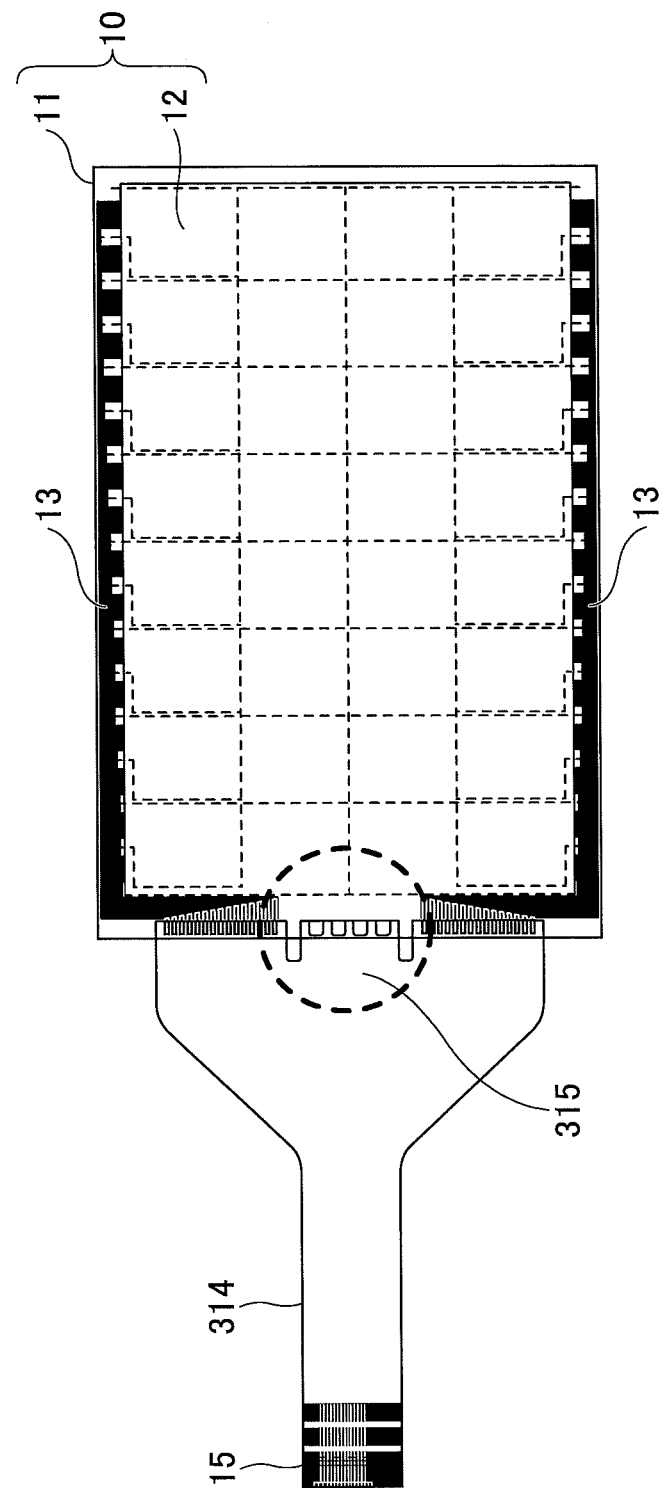
FIG. 18 is a plan view illustrating an upper electrode substrate of a touchscreen panel in a sixth embodiment of the present invention.
Figure 19:
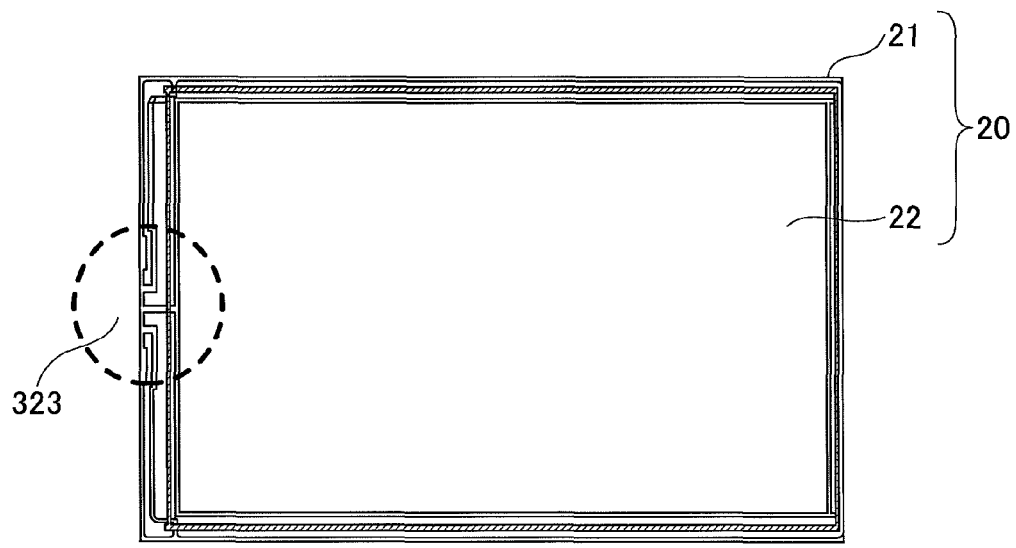
FIG. 19 is a bottom view illustrating a lower electrode substrate of the touchscreen panel in the sixth embodiment.
Figure 20:
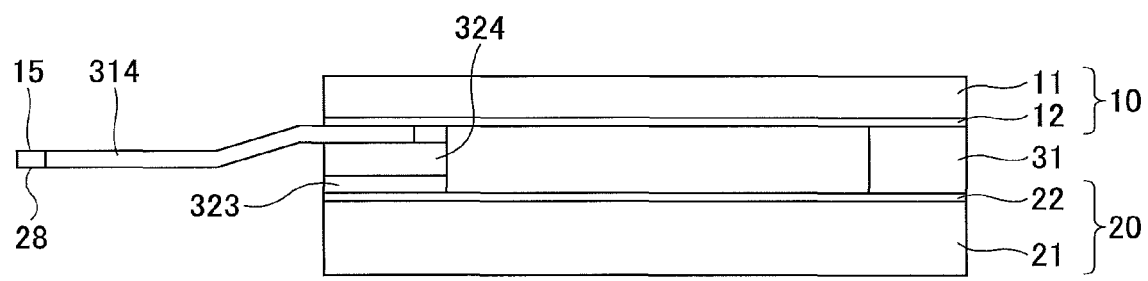
FIG. 20 is a cross sectional view illustrating the touchscreen panel in the sixth embodiment.

Next, a description will be given of a touchscreen panel in a sixth embodiment of the present invention, by referring to FIGS. 18 through 20. FIG. 18 is a plan view illustrating an upper electrode substrate of a touchscreen panel in the sixth embodiment of the present invention. FIG. 19 is a bottom view illustrating a lower electrode substrate of the touchscreen panel in the sixth embodiment, and FIG. 20 is a cross sectional view illustrating the touchscreen panel in the sixth embodiment. In FIGS. 18 through 20, those parts that are the same as those corresponding parts in FIGS. 5 through 7 are designated by the same reference numerals, and a description thereof will be omitted.

Of course, the number of conductive regions on the transparent conductor layer 12 is not limited to 32 as illustrated in FIG. 18. The transparent conductor layer 12 may be segmented into M conductive regions along a shorter side thereof (or vertical direction in FIG. 18), and may be segmented into N conductive regions along a longer side thereof (or horizontal direction in FIG. 18), where M and N are natural numbers greater than or equal to 2, and M may be equal to or different from N. In addition, the conductive regions of the transparent conductor layer 12 may have the configuration of any of the first through fifth embodiments described above and an eighth embodiment which will be described later.

In a case where the conductive regions of the transparent conductor layer 12 have the configuration illustrated in FIG. 16, for example, the leader electrodes 131, 132 and 133 form the electrode parts 13 that are arranged along the upper and lower ends of the lower electrode substrate 20, and connect to a terminal part (or terminal group) 323 illustrated in FIG. 19 by being wired along the left side of the lower electrode substrate 20 from the upper and lower ends. The terminal part 323 connects to a region 315 of a Flexible Printed Circuit (FPC) 314 as illustrated in FIG. 18. More particularly, the FPC 314 and the terminal part 323 of the electrode parts 13 are electrically connected by being bonded together via an anisotropic conductor film 324 as illustrated in FIG. 20. The FPC 314 has terminals 15 and 28 corresponding to the terminals 15 and 28 of the FPCs 14 and 27 of the first embodiment.

Accordingly, only a single FPC 314 is required in this embodiment to connect the touchscreen panel to the driving circuit or the like. As a result, it is possible to reduce the number of connectors required to connect the touchscreen panel to the driving circuit or the like, and the fabrication cost of the touchscreen panel can be reduced compared to the case where a plurality of FPCs are required to connect the touchscreen panel to the driving circuit or the like.

Seventh Embodiment

Figure 21:
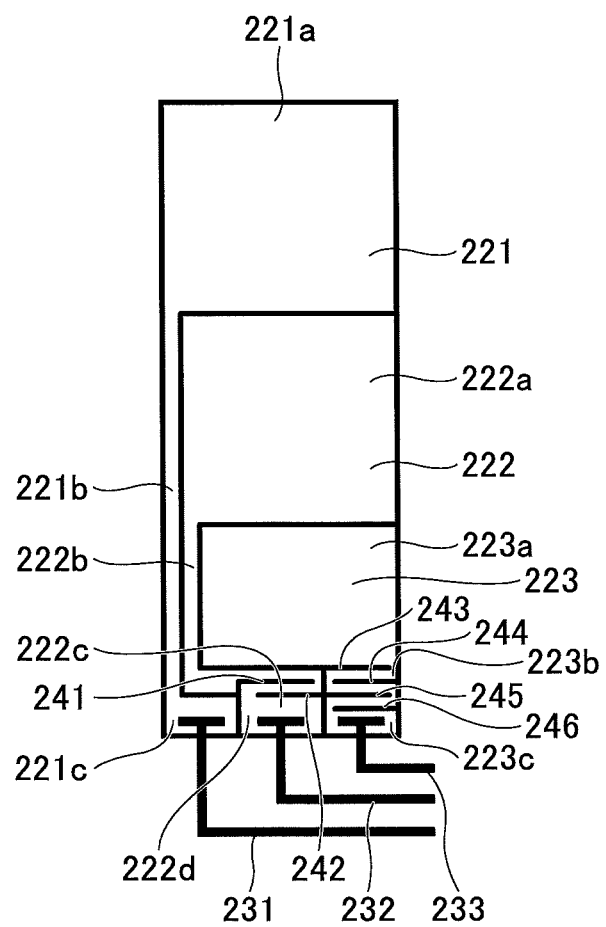
FIG. 21 is a diagram for explaining conductive regions of the upper electrode substrate of the touchscreen panel in a seventh embodiment of the present invention.

Next, a description will be given of a touchscreen panel in a seventh embodiment of the present invention, by referring to FIG. 21. FIG. 21 is a diagram for explaining conductive regions of the upper electrode substrate of the touchscreen panel in the seventh embodiment of the present invention. FIG. 21 illustrates a portion of the upper electrode substrate 10, having the transparent conductor layer 12 segmented into M=6 conductive regions along a shorter side thereof (or vertical direction) and segmented into N=8 conductive regions along a longer side thereof (or horizontal direction, for example, on an enlarged scale. The 48 conductive regions are grouped into 3 upper rows along the horizontal direction, and 3 lower rows along the horizontal direction. In FIG. 21, those parts having functions that are substantially the same as the functions of those corresponding parts in FIG. 14 are designated by the same reference numerals.

As illustrated in FIG. 21, the 3 conductive regions of the transparent conductor layer 12 in the 3 lower rows of the upper electrode substrate 10, at the rightmost column, for example, are formed by a conductive region 221, a conductive region 222, and a conductive region 223.

The conductive region 222 includes removed regions 241 and 242 in which the transparent conductor layer 12 is removed. Hence, the conductive region 222 has a region part 222a in which the contact position is detected, a leader part 222b extending from the region part 222a, a resistor part 222d that is formed between the removed regions 241 and 242, and a contact part 222c. The resistor part 222d is formed between the leader part 222b and the contact part 222c. The resistor part 222d of the transparent conductor layer 12 has a relatively long electrical path, and the resistance of the resistor part 222d may be set relatively large. The resistance of the resistor part 222d is adjusted to be the same as or, approximately the same as the resistance of the leader part 221b. In other words, the gap between the removed regions 241 and 242 along a direction perpendicular to the longitudinal direction of the upper electrode substrate 10, and the lengths of the removed regions 241 and 242 along the longitudinal direction of the upper electrode substrate 10 (and thus the length of the electrical path of the resistor part 222d) are adjusted so that the resistance of the resistor part 222d is adjusted to be the same as or, approximately the same as the resistance of the leader part 221b.

The conductive region 223 includes removed regions 243 and 244 in which the transparent conductor layer 12 is removed. Hence, the conductive region 223 has a region part 223a in which the contact position is detected, a resistor part 223b that is formed between the removed regions 243 and 244, and a contact part 223c. The resistor part 223b is formed between the region part 223a and the contact part 223c. The resistor part 223b of the transparent conductor layer 12 has a relatively long electrical path, and the resistance of the resistor part 223b may be set relatively large. The resistance of the resistor part 223b is adjusted to be the same as or, approximately the same as the a sum of the resistances of the leader part 222b and the resistor part 222d. In other words, the gap between the removed regions 243 and 244 along a direction perpendicular to the longitudinal direction of the upper electrode substrate 10, and the lengths of the removed regions 243 and 244 along the longitudinal direction of the upper electrode substrate 10 (and thus the length of the electrical path of the resistor part 223b) are adjusted so that the resistance of the resistor part 223b is adjusted to be the same as or, approximately the same as the sum of the resistances of the leader part 222b and the resistor part 222d.

The width of the leader part 221b along the longitudinal direction of the upper electrode substrate 10 may be made wider than the width of the leader part 222b, in order to match the resistances of the leader parts 221b and 222b and/or to adjust the sum of the resistances of the leader part 222b and the resistor part 222d.

From the point of view of minimizing alignments of patterns and fabrication costs, the removed regions 241 through 244 are preferably formed to extend in the same direction for each of the conductive regions of the transparent conductor layer 12. In addition, the removed regions 241 and 242 and the removed regions 243 and 244 of the conductive regions of the transparent conductor layer 12 belonging to the same column are respectively preferably aligned in the direction perpendicular to the longitudinal direction of the upper electrode substrate 10.

The conductive region 221 connects to a leader electrode 231 at the contact part 221c, the conductive region 222 connects to a leader electrode 232 at the contact part 222c, and the conductive region 223 connects to a leader electrode 233 at the contact part 223c. The contact part 221c of the conductive region 221 may be connected to the leader electrode 231 by applying silver paste (or solder paste) on the contact part 221c. Similarly, the conductive region 222 may be connected to the leader electrode 232 by applying silver paste (or solder paste) on the contact part 222c, and the conductive region 223 may be connected to the leader electrode 233 by applying silver paste (or solder paste) on the contact part 223c. A plurality of such leader electrodes 231, 232 and 233 form the leader electrode part 13 illustrated in FIG. 5 or FIG. 18.

Accordingly, in this embodiment, the resistance from the leader electrode 231 to the region part 221a of the conductive region 221 is the same as or, approximately the same as the resistance from the leader electrode 232 to the region part 222a of the conductive region 222, and is the same as or, approximately the same as the resistance from the leader electrode 233 to the region part 223a of the conductive region 223. By making the resistance from the leader electrode to the region part of the conductive region the same for each of the conductive regions of the transparent conductor layer 12, it becomes unnecessary to provide resistors or the like in a driving circuit (not illustrated) which drives the touchscreen panel that are otherwise required to compensate for the different threshold potentials for detecting the contact positions when the resistance from the leader electrode to the region part of the conductive region is different among the conductive regions of the transparent conductor layer 12. As a result, the touchscreen panel which enables simultaneous detection of multiple contact positions can be fabricated at a relatively low cost, because there is no need to perform a complex operation that is otherwise required to detect the multiple contact positions by the driving circuit if different threshold potentials are used to detect the multiple contact positions.

Moreover, the resistance from the region part 221a to the contact part 221c of the conductive region 221 is preferably the same as or, approximately the same as the resistance from the region part 222a to the contact part 222c of the conductive region 222, and the same as or, approximately the same as the resistance from the region part 223a to the contact part 223c of the conductive region 223. Hence, the width of the leader part 221b along the longitudinal direction of the upper electrode substrate 10 is made wider than the width of the leader part 222b.

Figure 22:
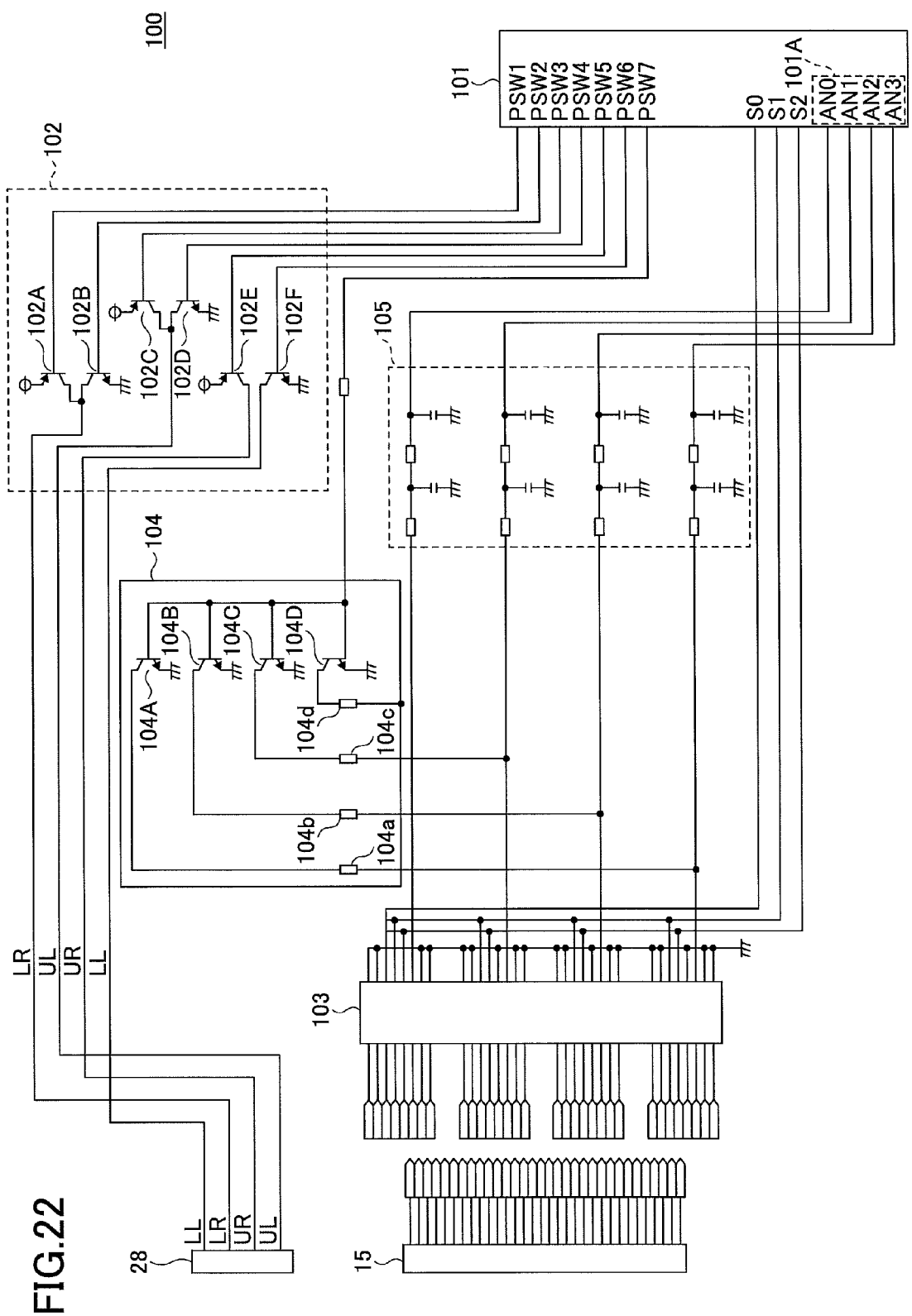
FIG. 22 is a circuit diagram illustrating an example of a driving circuit of the touchscreen panel.
Figure 23:
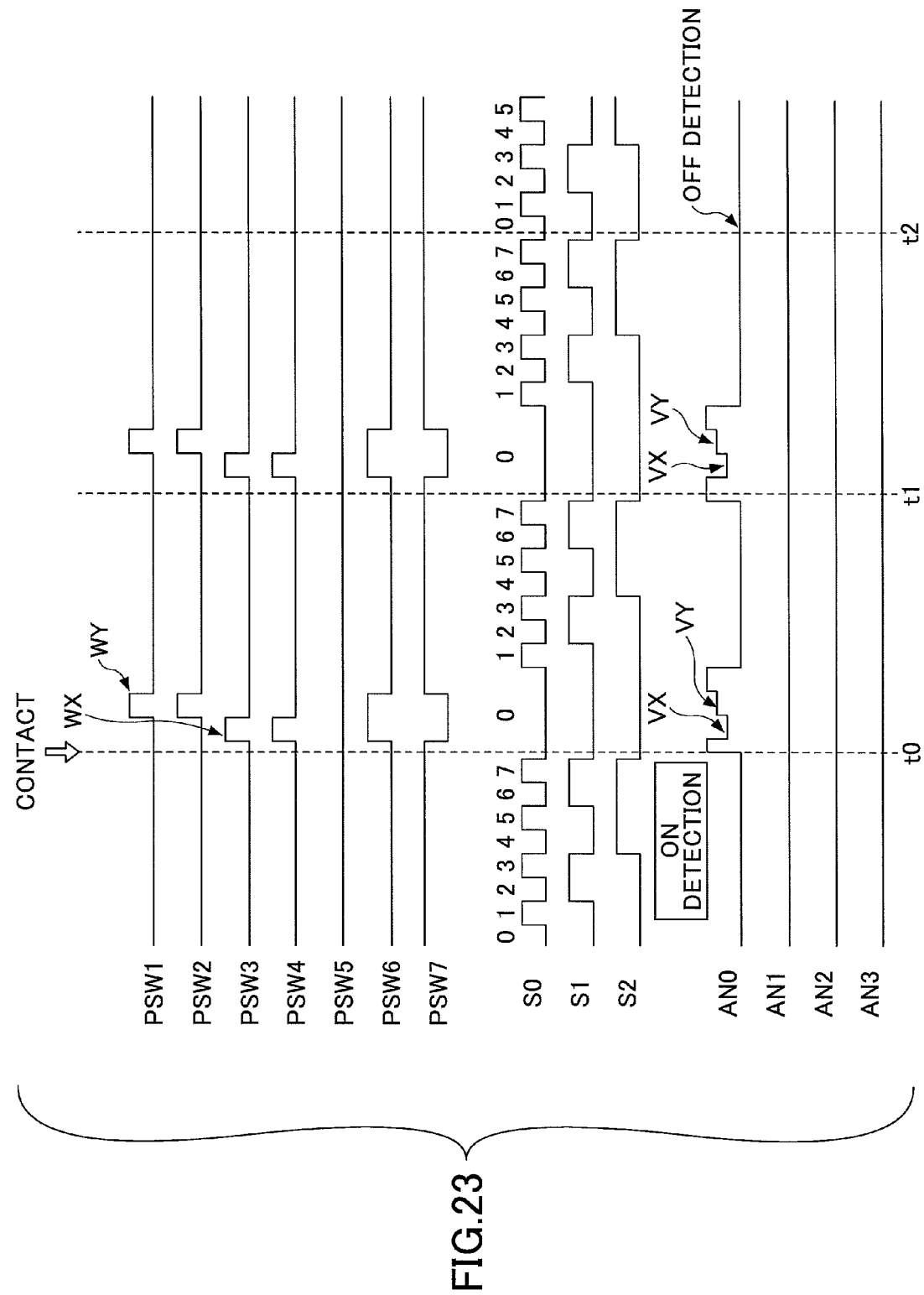
FIG. 23 is a timing chart for explaining an operation of the driving circuit illustrated in FIG. 22.

Next, a description will be given of an example of the driving circuit of the touchscreen panel, by referring to FIGS. 22 and 23. FIG. 22 is a circuit diagram illustrating this example of the driving circuit of the touchscreen panel, and FIG. 23 is a timing chart for explaining an operation of the driving circuit illustrated in FIG. 22. In order to simplify the description, it is assumed for the sake of convenience that the driving circuit drives the touchscreen panel having M×N conductive regions, where M=4 and N=8 as illustrated in FIG. 8, for example.

A driving circuit 100 illustrated in FIG. 22 alternately applies a voltage in the x-axis direction and in the y-axis direction via the electrode parts UL, UR, LL and LR that are provided at the four corner portions of the transparent conductor layer 22 on the lower electrode substrate 20 as illustrated in FIG. 8. When the transparent conductor layers 12 and 22 make contact at a contact position A that is pressed, for example, a potential is detected via the transparent conductor layer 22, in order to detect coordinate positions in the x-axis direction and the y-axis direction.

The driving circuit 100 illustrated in FIG. 22 includes a Micro Control Unit (MCU) 101, a potential control part 102, a multiplexer 103, an output adjusting circuit 104, and a noise filter 105. FIG. 22 also illustrates the terminals 15 and 28 of the FPCs 14 and 27 illustrated in FIG. 7 or, the terminals 15 and 28 of the single FPC 314 illustrated in FIG. 20.

The MCU 101 drives and controls the potential control part 102 and the multiplexer 103, and processes coordinate signals representing coordinates of the contact position where the upper electrode substrate 10 is pressed in order to detect the coordinate positions of the contact position. The MCU 101 includes an analog-to-digital converter (ADC) 101A that processes analog coordinate signals obtained from each of the 32 conductive regions of the transparent conductor layer 12 of the upper electrode substrate 10 into digital coordinate signals.

The potential control part 102 includes 6 transistors 102A through 102F. The potential control part 102 controls the voltages to be applied to the electrode parts UL, UR, LL and LR that are provided on the transparent conductor layer 22 of the lower electrode substrate 20, in order to alternately generate a potential distribution along the x-axis direction and a potential distribution along the y-axis direction on the lower electrode substrate 20, based on driving signals PSW1 through PSW6 that are output from the MCU 101.

The transistors 102A, 102C and 102E are formed by P-type transistors, and the transistors 102B, 102D and 102F are formed by N-type transistors. A power supply voltage (for example, 5 V) is applied to an emitter of the transistor 102A, and an emitter of the transistor 102B is grounded. The driving signals PSW1 and PSW2 output from the MCU 101 are respectively input to bases of the transistors 102A and 102B. In addition, a node connecting collectors of the transistors 102A and 102B is connected to the electrode part LR via the terminals 28.

A power supply voltage (for example, 5 V) is applied to an emitter of the transistor 102C, and an emitter of the transistor 102D is grounded. The driving signals PSW3 and PSW4 output from the MCU 101 are respectively input to bases of the transistors 102C and 102D. In addition, a node connecting collectors of the transistors 102C and 102D is connected to the electrode part UL via the terminals 28.

A power supply voltage (for example, 5 V) is applied to an emitter of the transistor 102E, and the driving signal PSW5 output from the MCU 101 is input to a base of the transistor 102E. A collector of the transistor 102E is connected to the electrode part UR via the terminals 28.

An emitter of the transistor 102F is grounded, and the driving signal PSW6 output from the MCU 101 is input to a base of the transistor 102F. A collector of the transistor 102F is connected to the electrode part LL via the terminals 28.

The multiplexer 103 is connected to the each of the 32 conductive regions of the transparent conductor layer 12 of the upper electrode substrate 10 via the terminals 15. The multiplexer 103 scans the conductive regions of the transparent conductor layer 12, one column at a time, and detects a signal representing a potential distribution of the conductive regions, based on region selection signals S0, S1 and S2 that are output from the MCU 101. The region selection signals S0, S1 and S2 select the 8 conductive regions within each row in a scanning order. In other words, the conductive regions within each of the 4 rows are selected in the scanning order of the columns based on the region selection signals S0, S1 and S2, and 4 conductive regions within the 4 rows belonging to 1 column are selected at one time. Output signals AN0 through AN3 representing the potential distribution for each row are output from the noise filter 105 and input to the ADC 101A of the MCU 101 wherein the xy coordinates are detected. As will be described later, the output signals AN0 through AN3 are derived from signals output from the terminals 15 of the touchscreen panel via the multiplexer 103.

The output adjusting circuit 104 is connected to outputs of the multiplexer 103, and includes adjusting resistors 104a through 140d and switching elements 104A through 104D formed by transistors that are connected as illustrated in FIG. 22. A driving signal PSW7 from the MCU 101 is input to bases of the switching elements 104A through 104D. The switching elements 104A through 104D are initially ON before the upper electrode substrate 10 of the touchscreen panel is pressed and the contact position is detected, in order to initially maintain the potential of the transparent conductor layer 22 of the lower electrode substrate 20 to a predetermined potential (for example, 0 V). When the upper electrode substrate 10 of the touchscreen panel is pressed and the contact position is to be detected, the switching elements 104A through 104D are turned OFF in order to hold potentials of respective signal lines in a floating state (or floating potential).

In the case where conductive regions of the transparent conductor layer 12 of the upper electrode substrate 10 have the configuration illustrated in the right part of FIG. 9, for example, the resistance of the 16 conductive regions in the 2 central rows is larger than the resistance of the 16 conductive regions in the upper and lower rows, and a relative delay occurs in the detection of the contact position based on the potential change for the 16 conductive regions in the two central rows because of the difference in the resistances. Accordingly, the resistance of the adjusting resistors 104b and 104c that are connected to the 2 central rows via the multiplexer 103 are adjusted to be smaller than the resistance of the adjusting resistors 104a and 104d that are connected to the upper and lower rows via the multiplexer 103. The output adjusting circuit 104 thus eliminates the difference in the response speed of detecting the contact position, between the conductive regions in the 2 central rows and the conductive regions in the upper and lower rows.

Of course, the output adjusting circuit 104 may be simplified or omitted in the case where conductive regions of the transparent conductor layer 12 of the upper electrode substrate 10 have the configuration illustrated in the right part of FIG. 14, for example, because the resistance of the 16 conductive regions in the 2 central rows is the same as or, approximately the same as the resistance of the 16 conductive regions in the upper and lower rows, due to the provision of the resistor part 222d of each conductive region 222.

The noise filter 105 is formed by an RC filter circuit, including inductor and capacitor elements, that is connected to the outputs of the multiplexer 103 and reduces or substantially eliminates noise in the outputs from the conductive regions of the transparent conductor layer 12 of the touchscreen panel that are obtained via the multiplexer 103. Thus, the output signals AN0 through AN3 that are input to the ADC 101A of the MCU 101 include no noise or substantially no noise that would deteriorate the accuracy of the contact position detection.

FIG. 23 illustrates the timings of the signals PSW1 through PSW7, S0 through S2, and AN0 through AN3 described above. It is assumed for the sake of convenience that the upper electrode substrate 10 is pressed to cause contact of the transparent conductor layers 12 and 22 at a time t0 and at a time t1.

In a state before the time t0, all of the driving signals PSW1 through PSW6 have a low level. Hence, the potentials at the electrode parts LR, UL and UR is 5 V, and the electrode part LL is at a floating potential. In this state, the driving signal PSW7 has a high level, and all of the switching elements 104A through 104D of the output adjusting circuit 104 are ON. Hence, all of the output signals AN0 through AN3 have a low level (or 0 V) and indicate that no contact position is detected.

The region selection signals S0 through S2 output from the MCU 101 selects and drives the conductive regions in each of the 4 rows in each of the 8 columns that are identified by column numbers 0 through 7 in FIG. 23. Hence, the region selection signals S0 through S2 output from the MCU 101 successively selects and drives the conductive regions of the transparent conductor layer 12, and the output signals AN0 through AN3 originating from the outputs of the touchscreen panel are input to the MCU 101. The conductive regions in the column number 0 is selected when the region selection signals S0 through S2 are S0=L, S1=L, S2=L, where "L" denotes the low signal level. The conductive regions in the column number 1 is selected when the region selection signals S0 through S2 are S0=H, S1=L, S2=L, where "H" denotes the high signal level. Similarly, the conductive regions in the column number 2 is selected when the region selection signals S0 through S2 are S0=L, S1=H, S2=L, the conductive regions in the column number 3 is selected when the region selection signals S0 through S2 are S0=H, S1=H, S2=L, the conductive regions in the column number 4 is selected when the region selection signals S0 through S2 are S0=L, S1=L, S2=H, the conductive regions in the column number 5 is selected when the region selection signals S0 through S2 are S0=H, S1=L, S2=H, the conductive regions in the column number 6 is selected when the region selection signals S0 through S2 are S0=L, S1=H, S2=H, and the conductive regions in the column number 7 is selected when the region selection signals S0 through S2 are S0=H, H, S2=H.

It is assumed for the sake of convenience in FIG. 23 that, at the time t0, the contact position occurs in the conductive region in the row corresponding to the output signal AN0 and in the column number 0. For example, this conductive region in the row corresponding to the output signal AN0 and in the column number 0 is the conductive region located at the upper left corner of the touchscreen panel.

When the potential of the output signal AN0 rises at the time t0, the driving signals PSW3, PSW4 and PSW6 rise to the high level in order to detect the x-coordinate, and consequently, the potential distribution in the x-axis direction is generated on the transparent conductor layer 22 of the lower electrode substrate 20. In this state, the driving signal PSW7 has the low level, and the switching elements 104A through 104D of the output adjusting circuit 104 are OFF.

Thereafter, the driving signals PSW3 and PSW4 fall to the low level and the driving signals PSW1 and PSW2 rise to the high level, in order to detect the y-coordinate. In FIG. 23, WX indicates the x-coordinate detecting waveform, and WY denotes the y-coordinate detecting waveform.

At the time t0, the transparent conductor layer 12 of the upper electrode substrate 10 that is pressed makes contact with the transparent conductor layer 22 of the lower electrode substrate 20. For this reason, a potential corresponding to the x-coordinate and the y-coordinate of the contact position is generated in the transparent conductor layer 12 of the upper electrode substrate 10 and output as the output signal corresponding to the output signal AN0.

The output signal AN0 is input to the MCU 101, and the xy coordinates of the contact position is converted into the digital signal by the ADC 101A within the MCU 101. In FIG. 23, VX denotes the x-coordinate voltage, and VY denotes the y-coordinate voltage.

When the detection of the xy coordinates ends, the driving signals PSW1, PSW2 and PSW6 return to the low level. As a result, preparations for detecting the output signal from the conductive region having the detected xy coordinate ends. The detection of the xy coordinates is performed in a similar manner when the contact position occurs within the same region at the time t1. Of course, the contact position occurring within other conductive regions of the transparent conductor layer 12 may be detected in a manner similar to that described above.

The 32 conductive regions of the transparent conductor layer 12 are insulated from each other as described above, and the output signals from the conductive regions are successively selected and output from the multiplexer 103 for each of the conductive regions. Accordingly, the coordinate detection can be made separately and independently for each of the 32 conductive regions in the 8 columns (column numbers 0 through 7), based on the output signals AN0 through AN3 of the MCU 101 corresponding to the 4 rows.

The driving circuit illustrated in FIG. 22 that drives the touchscreen panel having M×N conductive regions, where M=4 and N=8, may be suitably modified to form a driving circuit that drives a touchscreen panel having M×N conductive regions, where M and N are other than M=4 and N=8. For example, if M=4 and N=4, the number of terminals 15 of the FPC 14 and the number of terminals of the multiplexer 103 change (decrease in this case) compared to those for the case where M=4 and N=8, and the number of circuit elements within the output adjusting circuit 104 and the number of circuit elements within the noise filter 105 change (decrease in this case) compared to those for the case where M=4 and N=8, and thus, the driving circuit illustrated in FIG. 22 may be modified according to these changes.

The time-divisional scan of the conductive regions of the transparent conductor layer 12 enables the detection of the contact position in the touchscreen panel, even if multiple contact positions are pressed simultaneously, and even if the contact position moves.

Each of the embodiments of the present invention may be applied to 5-wire resistive touchscreen panels, and the 5-wire resistive touchscreen panel in accordance with each of the embodiments may be used in various electronic apparatuses. Examples of the electronic apparatuses include portable telephones (or mobile telephones), Portable Digital Assistants (PDAs), various multi-media equipments including portable music players, portable video players, portable browsers and 1-seg (or 1-segment) tuners, electronic dictionaries, navigation systems, computers, Point-Of-Sales (POS) terminals, inventory management terminals, Automatic Teller Machines (ATMs), cameras, digital photo frames, remote control devices, office equipments including copying machines, facsimile machines and Multi-Function Peripherals (MFPs), home appliances, and the like.

Figure 24:
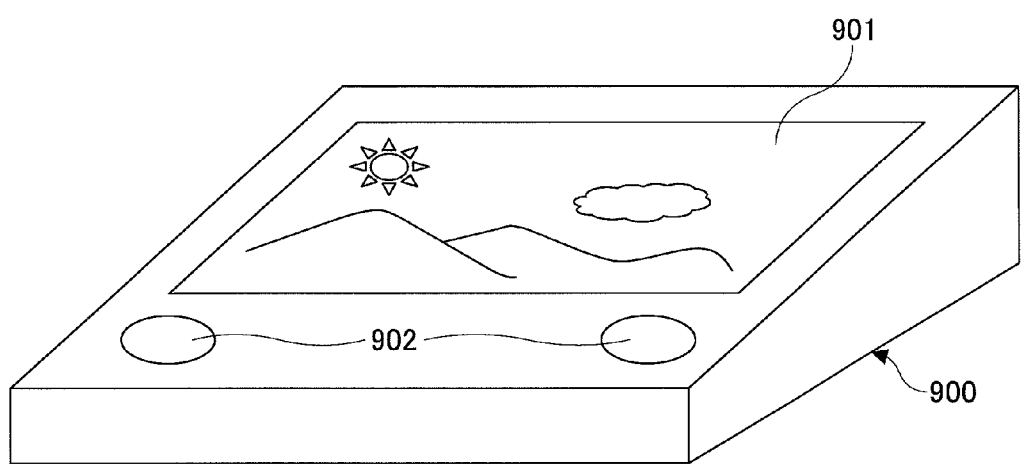
FIG. 24 illustrates an example of an electronic apparatus having the touchscreen panel in accordance with any of the embodiments.

FIG. 24 illustrates an example of an electronic apparatus having the touchscreen panel in accordance with any of the embodiments described above. In this example, the electronic apparatus is formed by a digital photo frame (or digital media frame) 900.

The digital photo frame 900 illustrated in FIG. 24 includes a touchscreen panel 901 and buttons (or switches) 902 that are provided on a housing (or casing), and a driving circuit, such as the driving circuit 100 illustrated in FIG. 22, that is electrically connected to the touchscreen panel 901 and is provided within the housing. For example, one of the buttons 902 may be pushed to turn ON or turn OFF the power of the digital photo frame 900. The other of the buttons 902 may be pushed to switch the display on the touchscreen panel 901 between the photograph and an operation menu, for example. Other inputs or instructions to the digital photo frame 900 may be made by pressing the appropriate portions within the displayed operation menu, for example. The user may simultaneously press a plurality of portions within the displayed operation menu.

In the digital photo frame 900, the touchscreen panel 901 may include the driving circuit or, the driving circuit may be connected externally to the touchscreen panel 901.

Further, the present invention is not limited to these embodiments, but various variations and modifications may be made without departing from the scope of the present invention.

What is claimed is:

1. A method of fabricating a touchscreen panel, comprising:
    forming a first substrate having a first transparent conductor layer provided on a first base layer;
    forming a second substrate having a second transparent conductor layer provided on a second base layer;
    segmenting the first transparent conductor layer into an array of M rows by N columns of conductive regions that are electrically insulated from each other, where M and N are natural numbers greater than or equal to 2; and
    bonding the first and second transparent conductor layers with a spacer interposed therebetween so that the first and second transparent conductor layers oppose each other and make contact when the first base layer is pressed, wherein said segmenting the first transparent conductor layer is performed before said bonding the first and second transparent conductor layers, and wherein one column of the conductive regions is formed to include
- a first conductive region coupled to a first electrode at one end of the first substrate extending in a direction along the rows, and
- a second conductive region, having a leader part extending along and between one side of the first conductive region and a column adjacent to the one column, and coupled to a second electrode via the leader part at the one end of the first substrate.

2. The method of fabricating the touchscreen panel as claimed in claim 1, wherein said segmenting the first transparent conductor layer irradiates a charged particle beam on the first transparent conductor layer to electrically insulate mutually adjacent conductive regions from each other by a gap that is formed by eliminating the first transparent conductor layer by the charged particle beam.

3. The method of fabricating the touchscreen panel as claimed in claim 2, wherein a laser beam or an electron beam is used as the charged particle beam.

4. The method of fabricating the touchscreen panel as claimed in claim 1, wherein said segmenting the first transparent conductor layer segments the first transparent conductor layer so that each of the conductive regions has an approximately rectangular shape having sides in a range of 5 mm to 25 mm, and a width of a gap insulating two mutually adjacent conductive regions of the first transparent conductor layer is in a range of 0.1 μm to 1 mm.

\* \* \* \* \*